US009288405B2

(12) United States Patent
Imahira et al.

(10) Patent No.: US 9,288,405 B2
(45) Date of Patent: Mar. 15, 2016

(54) IMAGE OUTPUT DEVICE AND METHOD OF OUTPUTTING IMAGE

(71) Applicant: FURYU CORPORATION, Tokyo (JP)

(72) Inventors: Aki Imahira, Kyoto (JP); Sachiyo Kanazawa, Osaka (JP); Tadao Hayakawa, Kyoto (JP)

(73) Assignee: FURYU CORPORATION, Tokyo (JP)

( * ) Notice: Subject to any disclaimer, the term of this patent is extended or adjusted under 35 U.S.C. 154(b) by 0 days.

(21) Appl. No.: 14/454,408

(22) Filed: Aug. 7, 2014

(65) Prior Publication Data

US 2015/0138378 A1    May 21, 2015

(30) Foreign Application Priority Data

Aug. 9, 2013 (JP) .................................. 2013-166835

(51) Int. Cl.
*G03B 15/00* (2006.01)
*H04N 5/262* (2006.01)
*G06K 15/02* (2006.01)
*H04N 1/00* (2006.01)
*H04N 5/232* (2006.01)
*H04N 101/00* (2006.01)

(52) U.S. Cl.
CPC ............ *H04N 5/2624* (2013.01); *G06K 15/024* (2013.01); *H04N 1/00278* (2013.01); *H04N 5/23293* (2013.01); *G06K 2215/0097* (2013.01); *H04N 2101/00* (2013.01); *H04N 2201/0084* (2013.01)

(58) Field of Classification Search
USPC .............................................................. 396/2
See application file for complete search history.

(56) References Cited

U.S. PATENT DOCUMENTS

| 5,623,581 | A * | 4/1997 | Attenberg ....................... 358/1.6 |
| 2001/0041020 | A1* | 11/2001 | Shaffer et al. ................. 382/305 |
| 2001/0046330 | A1* | 11/2001 | Shaffer et al. ................. 382/284 |
| 2004/0081440 | A1* | 4/2004 | Miwa et al. ....................... 396/2 |
| 2005/0174349 | A1* | 8/2005 | Watson ............................. 345/427 |
| 2013/0243413 | A1* | 9/2013 | Choi ................................. 396/2 |
| 2014/0304629 | A1* | 10/2014 | Cummins et al. ............. 715/764 |
| 2015/0009359 | A1* | 1/2015 | Zaheer et al. ............... 348/223.1 |

FOREIGN PATENT DOCUMENTS

| JP | A-2005-124134 | 5/2005 |
| JP | 2005173076 A | 6/2005 |
| JP | 2006072045 A | 3/2006 |

(Continued)

OTHER PUBLICATIONS

Dec. 15, 2015 Office Action issued in Japanese Patent Application No. 2013-166835.

*Primary Examiner* — Clayton E Laballe
*Assistant Examiner* — Warren K Fenwick
(74) *Attorney, Agent, or Firm* — Oliff PLC

(57) ABSTRACT

A shooting processing section shoots one or more users as an object to generate a shot image, an editing processing section allows the one or more users to edit the shot image, and an outputting section outputs the shot image that is edited. A display control section controls display of at least one image for compositing to be composited to the shot image, and the image for compositing based on a purpose of behavior of the one or more users, and a compositing processing section composites the displayed image for compositing to the shot image. The present invention can be applied to a photo sticker creating device, for example.

11 Claims, 24 Drawing Sheets

(56) References Cited

FOREIGN PATENT DOCUMENTS

| JP | 2006339951 | A | 12/2006 |
| JP | 2012034244 | A | 2/2012 |
| JP | A-2012-37735 | | 2/2012 |
| JP | A-2012-177741 | | 9/2012 |

* cited by examiner

PROF-select / ROUGH-design / HIGH-design

▽ MESSAGE  ▽ STAMP  ▽ □ GYZA

ROTATION
DEPTH
CHARACTER  OVER UNDER
SIZE

FIG. 24

IMAGE OUTPUT DEVICE AND METHOD OF OUTPUTTING IMAGE

BACKGROUND

1. Technical Field

The present invention relates to an image output device and a method of outputting an image, and especially relates to an image output device and a method of outputting an image that make editing work of a user easy.

2. Related Art

Photo sticker machines that take photos of users, allow the users to perform editing images obtained by taking the photos, print an image after editing on a sticker sheet, and provide the sticker sheet are known. Hereinafter, taking photographs of the users and obtaining images will be referred to as "shooting" or "shooting the users". Such photo sticker machines are installed in amusement (play) facilities, or the like. Main users of the photo sticker machines are females. In a photo sticker machine, the user selects an editing target image from shot images, and performs editing by compositing an image prepared in advance to the selected image, or inputting characters or line drawing to the selected image.

Among such photo sticker machines, there is a photo sticker machine that allows the user to select a shooting course (couple course/friend course) at the time of shooting, and performs editing processing based on the selected shooting course (see JP 2012-37735 A). In such a photo sticker machine, when the couple course has been selected, for example, an editing tool that enables easy editing work is provided to a male user who is not accustomed to the editing work. Accordingly, even the male user who is not accustomed to the editing work can easily proceed in the editing work.

Further, there are a photo sticker machine that displays a question that is a clue about the editing work to the user when allowing the user to perform the editing work, and a photo sticker machine that displays a question related to a taste of the user, and displays an image for compositing based on a response of the user to the question.

SUMMARY

However, in the photo sticker machine of JP 2012-37735 A, only the editing tool that enables easy editing work is provided to the male user. Thus the male user can perform only the editing work in the range of the editing tool.

Similarly, even in the photo sticker machine that displays a question that is a clue about the editing work to the user, the user may be able to perform only the editing work following the clue, although the editing work can be made easy.

Further, in the photo sticker machine that displays an image for compositing based on a response to the question related to a taste of the user, the editing work itself cannot be made easy, although the image for compositing based on the taste of the user can be provided.

The present invention has been made in view of the foregoing, and makes editing work desired by the user easy.

An image output device of one aspect of the present invention includes: a shooting processing section configured to shoot one or more users as an object to generate a shot image; an editing processing section configured to allow the one or more users to edit the shot image; an output processing section configured to output the shot image that is edited; a display control section configured to control display of at least one image for compositing to be composited to the shot image, and the image for compositing based on a purpose of behavior of the one or more users; and a compositing processing section configured to composite the displayed image for compositing to the shot image.

The display control section may control display of a group of images for compositing including the image for compositing based on a purpose of behavior of the one or more users.

The compositing processing section may composite, to the shot image, the image for compositing selected by the user from the group of images for compositing.

The display control section may control display of images for compositing based on a purpose of behavior of the user and a relationship between the users.

The display control section may control display of a screen that displays the purposes of behavior of the user as candidates of a response to a question to the user, and control display of the image for compositing based on the purpose of behavior of the one or more users corresponding to the response selected on the screen.

The display control section may control display of a group of images for compositing made of only the images for compositing based on a purpose of behavior of the one or more users.

The display control section may control display of a group of images for compositing made of only images for compositing not based on the purpose of behavior of the one or more users, separately from a group of images for compositing made of only the images for compositing based on the purpose of behavior of the one or more users.

The shooting processing section may shoot the one or more users as an object in a shooting space, and the editing processing section may allow the one or more users to edit the shot image in an editing space different from the shooting space.

The output processing section may print the shot image on a sticker sheet.

The output processing section may output the shot image to a mobile terminal through a server.

A method of outputting an image of one aspect of the present invention includes: by an image output device, shooting one or more users as an object to generate a shot image; allowing the one or more users to edit the shot image; outputting the shot image that is edited; displaying at least one image for compositing to be composited to the shot image, and the image for compositing based on a purpose of behavior of the one or more users; and compositing the displayed image for compositing to the shot image.

In one aspect of the present invention, one or more users are shot as an object, a shot image is generated, editing is performed for the shot image by the one or more users, the shot image that is edited is output, at least one image for compositing to be composited to the shot image, and based on a purpose of behavior of the one or more users is displayed, and the displayed image for compositing is =posited to the shot image.

According to the present invention, the editing work desired by the user can be made easy.

BRIEF DESCRIPTION OF DRAWINGS

FIG. 22 is a diagram illustrating an example of a palette for editing;

FIG. 23 is a diagram illustrating an example of the palette for editing;

FIG. 24 is a diagram illustrating an example of the palette for editing;

DETAILED DESCRIPTION

Hereinafter, specific embodiments to which the present invention is applied will be described in detail with reference to the drawings.

[Configuration of Appearance of Photo Sticker Creating Device]

Figure 1:
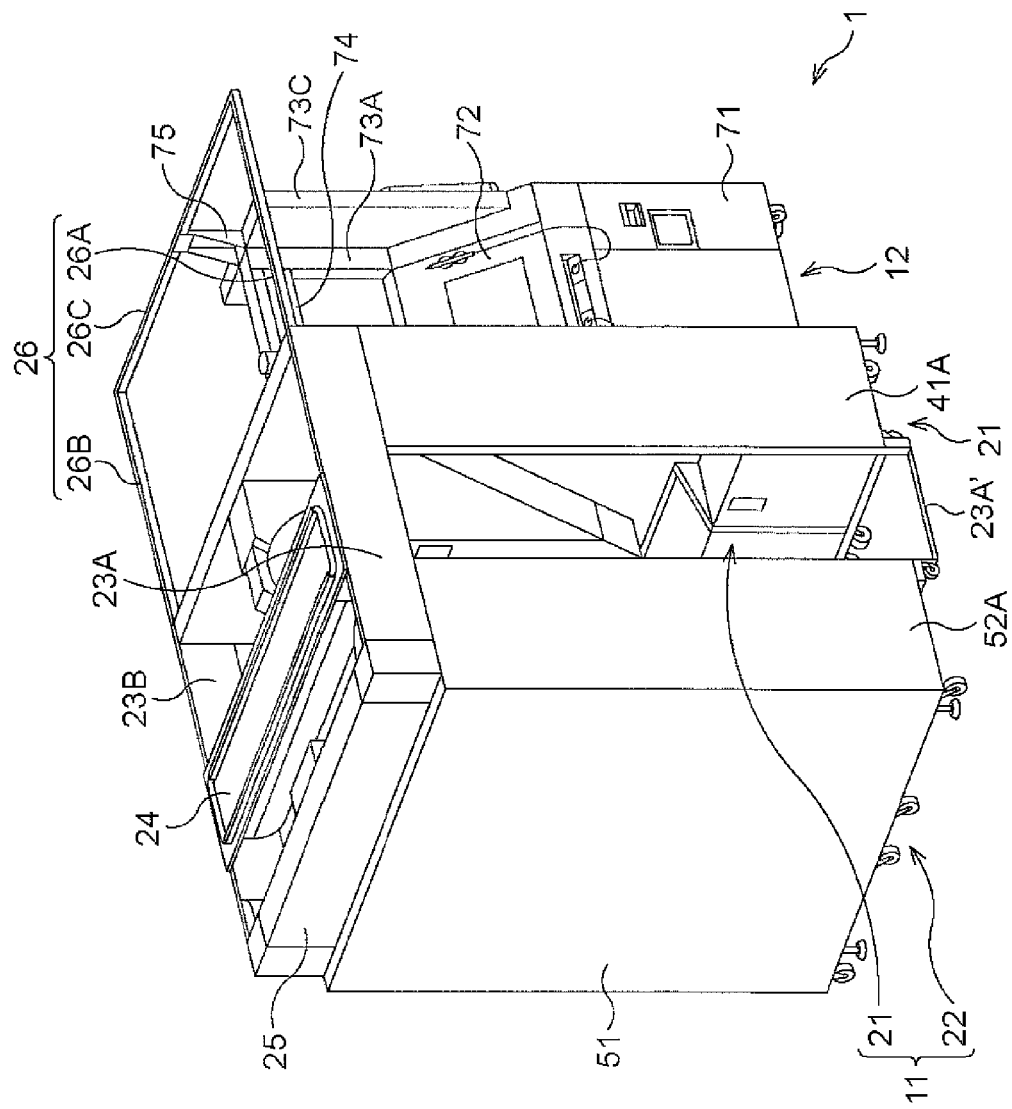
FIG. 1 is a perspective view illustrating a configuration example of an appearance of a photo sticker creating device according to an embodiment of the present invention.

FIG. 1 is a perspective view illustrating a configuration example of an appearance of a photo sticker creating device 1.

The photo sticker creating device 1 is a game device that provides a shot image and an edited image. The photo sticker creating device 1 provides an image by printing the image on a sticker sheet, or by making an image transmitted to a server browsable on a mobile terminal of the user. The photo sticker creating device 1 is installed in a shop such as a game arcade. The user may be a single person, or may be a plurality of persons, such as two or three persons.

The user herself/himself who plays with the photo sticker creating device 1 becomes an object and performs shooting. Then, the user edits an image selected from among shot images obtained by the shooting, by inputting handwritten characters or by compositing stamp images prepared in advance in the photo sticker creating device 1 to the selected shot image, thereby to cause the shot image to be a colorful image. The user receives a sticker sheet on which the shot image and the edited image that is an image subjected to editing are printed, and terminates a series of a game.

As illustrated in FIG. 1, the photo sticker creating device 1 is configured such that, basically, a shooting unit 11 and an editing unit 12 are installed in a contact state.

The shooting unit 11 is configured from a shooting portion 21 and a background portion 22. The shooting portion 21 and the background portion 22 are installed being separated by a predetermined distance. A space formed between the shooting portion 21 and the background portion 22 becomes a shooting space in which shooting processing is performed.

The shooting portion 21 is a device for shooting the user as an object. The shooting portion 21 is positioned in front of the user who has entered the shooting space. A camera, a touch panel monitor used for an operation related to the shooting, and the like are provided in the front of the shooting portion 21 that faces the shooting space. When a surface of a right side as viewed from the user in the shooting space is a right side surface, and a surface of a left side is a left side surface, the right side surface of the shooting portion 21 is configured from a side surface panel 41A and the left side surface is configured from a side surface panel 41B (FIG. 3).

Figure 3:
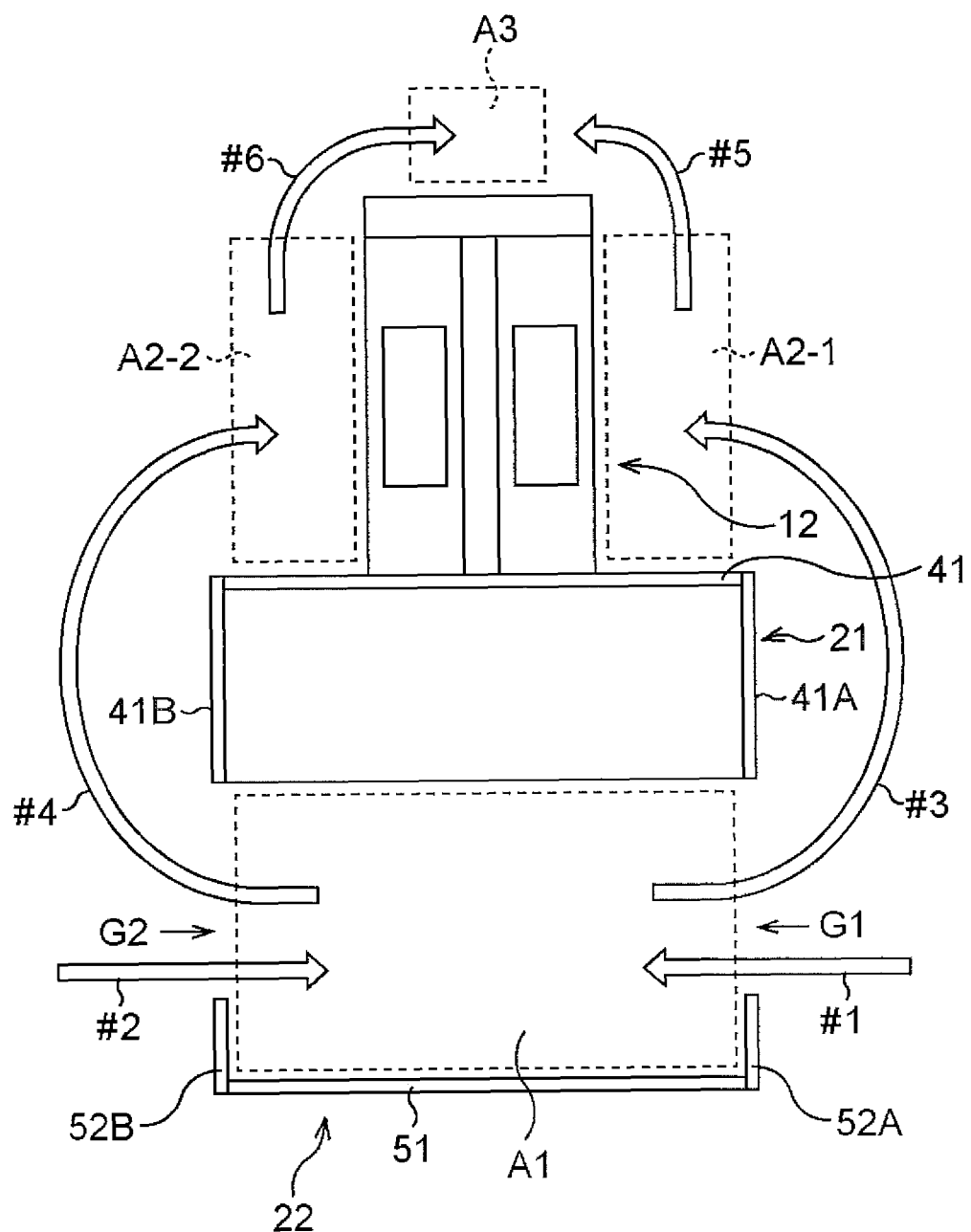
FIG. 3 is a diagram describing movement of a user.

The background portion 22 is configured from a back surface panel 51, a side surface panel 52A, and a side surface panel 523 (FIG. 3). The back surface panel 51 is a plate member positioned at a back surface side of the user who performs shooting, facing the front. The side surface panel 52A is a plate member having a narrower breadth than the side surface panel 41A, and attached to a right end of the back surface panel 51. The side surface panel 525 is a plate member having a narrower breadth than the side surface panel 41B, and attached to a left end of the back surface panel 51.

Figure 9:
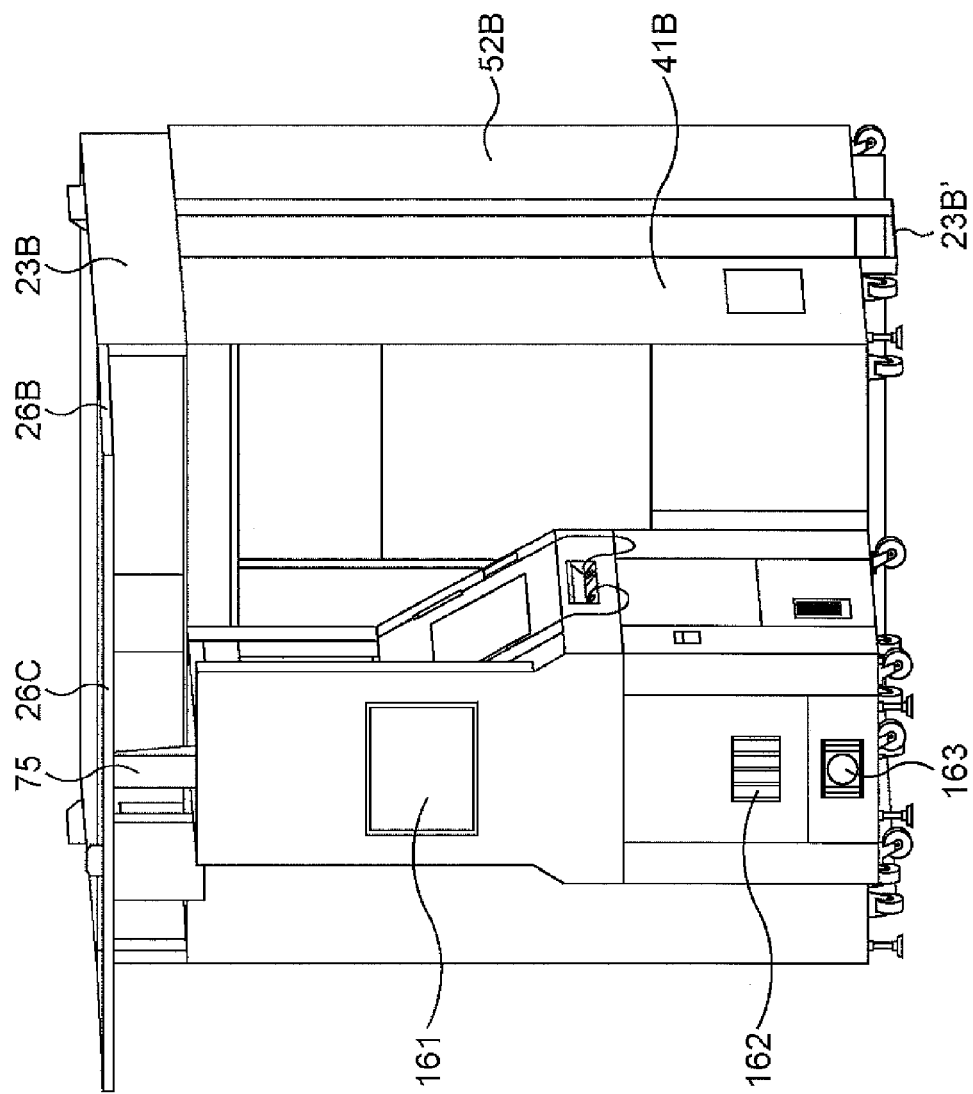
FIG. 9 is a diagram illustrating a configuration example of the right side surface of the editing unit.

The side surface panel 41A that configures the right side surface of the shooting portion 21 and the side surface panel 52A of the background portion 22 are provided in almost the same plane. Respective upper portions of the side surface panel 41A and the side surface panel 52A are coupled by a coupling portion 23A that is a plate member, and respective lower portions are coupled by a coupling portion 23A' that is a member made of a metal provided in a floor surface. The side surface panel 41B that configures the left side surface of the shooting portion 21 and the side surface panel 525 of the background portion 22 are similarly provided in almost the same plane, and respective upper portions are coupled by a coupling portion 23B and respective lower portions are coupled by a coupling portion 233' (FIG. 9).

An opening formed by being surrounded by the side surface panel 41A of the shooting portion 21, the coupling portion 23A, and the side surface panel 52A of the background portion 22 becomes an entrance of the shooting space. Further, an opening formed by being surrounded by the side surface panel 41B of the shooting portion 21, the coupling portion 23B, and the side surface panel 523 of the background portion 22 also becomes an entrance.

A background curtain unit 25 is provided at an upper portion of the background portion 22 in the form of being supported by the back surface panel 51, the side surface panel 52A, and the side surface panel 52B.

Figure 6:
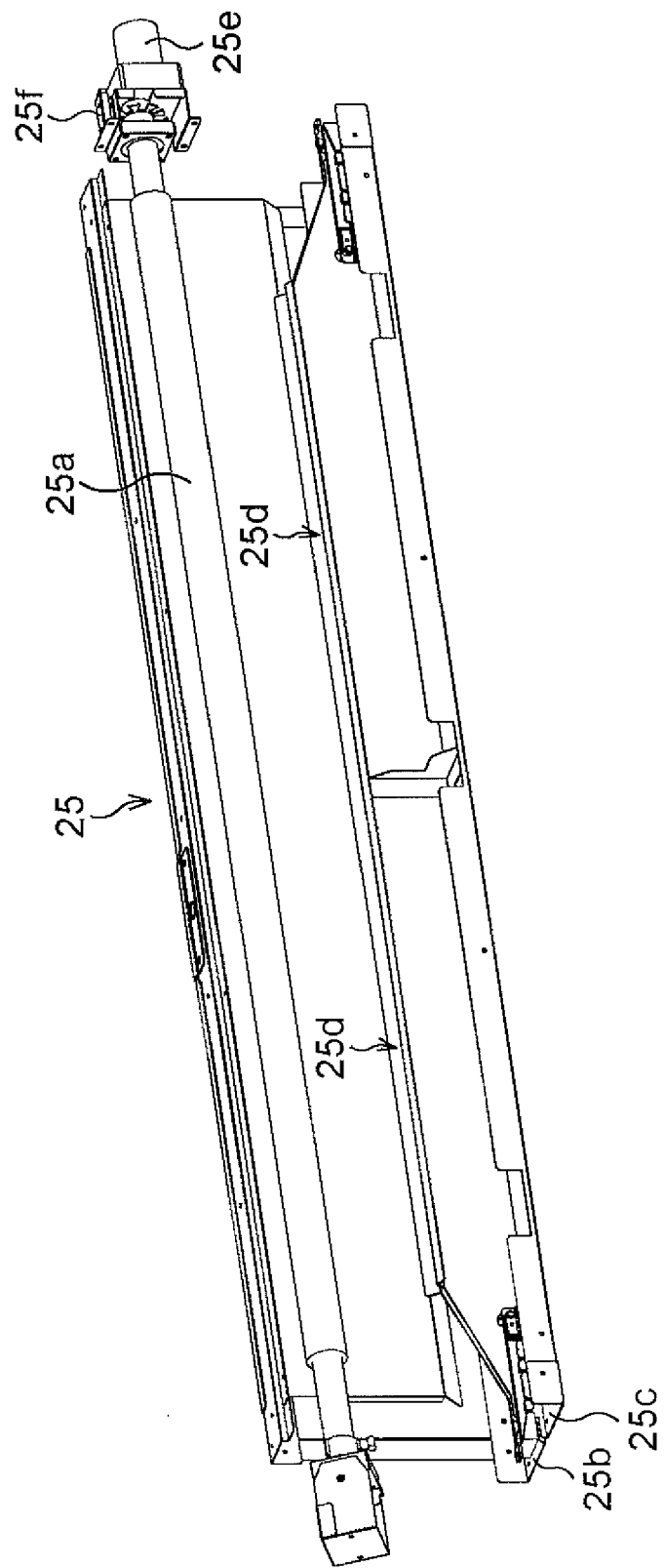
FIG. 6 is a diagram describing a structure of a background curtain unit.

FIG. 6 is a diagram describing a structure of the background curtain unit 25.

In the background curtain unit 25, a background curtain of a predetermined color is housed in a state of being wound around a shaft 25a. The background curtain of a predetermined color appears in the background of the user in the shot image obtained by the shooting. A slit 25d is provided between a member 25b and a member 25c that configure a lower side of the background curtain unit 25. The background curtain wound by the shaft 25a is lowered in the shooting space through the slit 25d by rotation of the shaft 25a by a motor 25e provided at an end of the shaft 25a. An illuminance sensor 25f is provided above the motor 25e. The illuminance sensor 25f measures illuminance in a direction of the shaft 25a in the background curtain unit 25. In the background curtain unit 25, whether the background curtain has been completely wound by the shaft 25a is determined according to the illuminance measured by the illuminance sensor 25f.

The background curtain unit 25 appropriately lowers a green curtain for performing chroma key compositing (hereinafter, referred to as chroma key curtain) in the shooting space in conjunction with the shooting. Raising and lowering of the background curtain by the background curtain unit 25 is sometimes performed or sometimes not performed according to a shooting course selected by the user.

Note that the chroma key curtain may be affixed to the back surface panel 51 in advance without providing the background curtain unit 25. The back surface panel 51 is a back surface of the shooting space. When the shooting is performed using the chroma key curtain as the background, a plurality of types of background images is prepared, and chroma key processing is performed in shooting processing or editing processing. In this way, the user can composite a desired background image on a portion of the curtain.

An opening surrounded by the front of the shooting portion 21, the coupling portion 23A, the coupling portion 232, and the background curtain unit 25 is formed above the shooting space, and a ceiling strobe unit 24 is provided to cover a part of the opening. One end of the ceiling strobe unit 24 is fixed to the coupling portion 23A, and the other end is fixed to the coupling portion 23B. The ceiling strobe unit 24 incorporates a strobe that irradiates an inside of the shooting space with light in accordance with the shooting. A fluorescent light is provided in an interior of the ceiling strobe unit 24, in addition to the strobe, and also functions as illumination of the shooting space.

The editing unit 12 is a device for editing the shot images. The editing unit 12 is provided, being coupled with the shooting unit 11 such that one side surface comes in contact with the back surface of the shooting portion 21.

Configurations used for editing are respectively provided at a front surface side and a back surface side of the editing unit 12 so that two pairs of users can perform editing at the same time, where the configuration of the editing unit 12, a part of which can be seen in FIG. 1, is the configuration of the front surface side.

Figure 2:
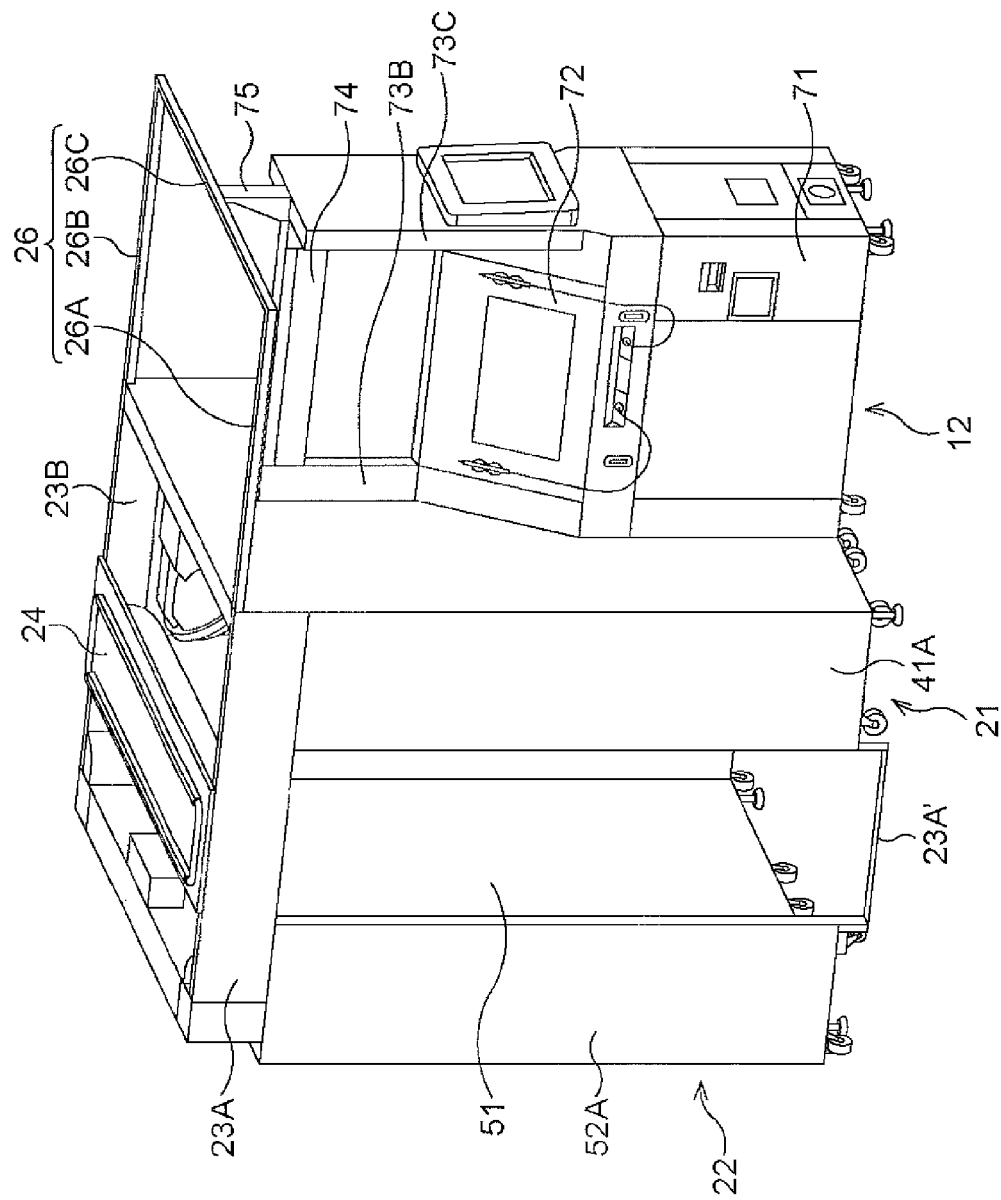
FIG. 2 is a perspective view of the appearance of the photo sticker creating device as viewed from another angle.

The front surface side of the editing unit 12 is configured from a surface 71, and a slope surface 72. The surface 71 is a surface vertical to the floor surface and is a surface nearly parallel to the side surface panel 41A of the shooting portion 21. The slope surface 72 is formed above the surface 71. On the slope surface 72, a configuration used for editing work is provided. On the right side of the slope surface 72, a columnar supporting portion 73A that supports one end of the illumination device 74 is provided. On the left side of the slope surface 72, a columnar supporting portion 733 that supports the other end of the illumination device 74 is provided (FIG. 2). On the right side of the supporting portion 73A, a plate-like panel 73C that configures a side surface of the editing unit 12 is provided. On an upper surface of the panel 730, a supporting portion 75 that supports the curtain rail 26 is provided.

A curtain rail 26 is attached above the editing unit 12. The curtain rail 26 is configured by combining of three rails 26A to 26C such that the shape of the three rails 26A to 26C as viewed from above becomes a U shape. One ends of the rails 26A and 263 provided in parallel are fixed to the coupling portion 23A and the coupling portion 236, respectively, and both ends of the rail 26C are joined to the other ends.

A curtain is attached to the curtain rail 26 so that interiors of a front space in front of the editing unit 12 and a front space behind the editing unit 12 cannot be seen from an outside. The front space in front of the editing unit 12 and the front space behind the editing unit 12 surrounded by the curtain attached to the curtain rail 26 become editing spaces in which the user edits the shot image.

FIG. 2 is another perspective view of the photo sticker creating device 1.

Although to be described in detail, a tablet built-in monitor and an outlet through which a printed sticker sheet is discharged are provided in a right side surface of the editing unit 12. The tablet built-in monitor provided on the side surface of the editing unit 12 is used when the user who waits for completion of printing of an image uses a post-service function that is a function provided after the shooting and editing. The post-service function includes a function to transmit the shot image or the edited image to a server, a function of mini game, and the like. A front space of the right side surface of the editing unit 12 becomes a post-service space.

Here, a flow of a photo sticker creation game and movement of a user associated with the game will be described. FIG. 3 is a plan view of the photo sticker creating device 1 as viewed from above.

The user of the photo sticker creating device 1 enters a shooting space A1 formed between the shooting portion 21 and the background portion 22 from an entrance G1 as illustrated by an outline arrow #1, or from an entrance G2 as illustrated by an outline arrow #2, and shooting by a camera is performed a plurality of times by use of a touch panel monitor provided in the shooting portion 21. The entrance G1 is an opening between the side surface panel 41A and the side surface panel 52A, and the entrance G2 is an opening between the side surface panel 41B and the side surface panel 523.

The user who has completed the shooting goes out of the shooting space A1 through the entrance G1 as illustrated by an outline arrow #3, and moves to an editing space A2-1, or goes out of the shooting space A1 through the entrance G2 as illustrated by an outline arrow #4, and moves to an editing space A2-2.

The editing space A2-1 is an editing space of the front surface side of the editing unit 12, and the editing space A2-2 is an editing space of the back surface side of the editing unit 12. Whether the user should move to either the editing space A2-1 or the editing space A2-2 is guided to the user by screen display of the touch panel monitor of the shooting portion 21. For example, a free space of the two editing spaces is guided to the user as a destination. The user who has moved to the editing space A2-1 or the editing space A2-2 starts editing work. As described above, with the two editing spaces, two pair of users: the user in the editing space A2-1, and the user in the editing space A2-2 can perform editing work at the same time.

After completion of the editing, printing of the shot images or the edited images is started. During the printing of the images, the user who has completed the editing in the editing space A2-1 moves from the editing space A2-1 to a post-service space A3 as illustrated by an outline arrow #5, and uses the post-service function. The user who has completed the editing in the editing space A2-2 moves from the editing space A2-2 to a post-service space A3 as illustrated by an outline arrow #6, and uses the post-service function.

When the printing of the images has been completed, the user receives a sticker sheet through an outlet provided in the right side surface of the editing unit 12, and completes a series of a photo sticker creation game.

Next, configurations of respective units and portions will be described.

[Configuration of Shooting Portion]

Figure 4:
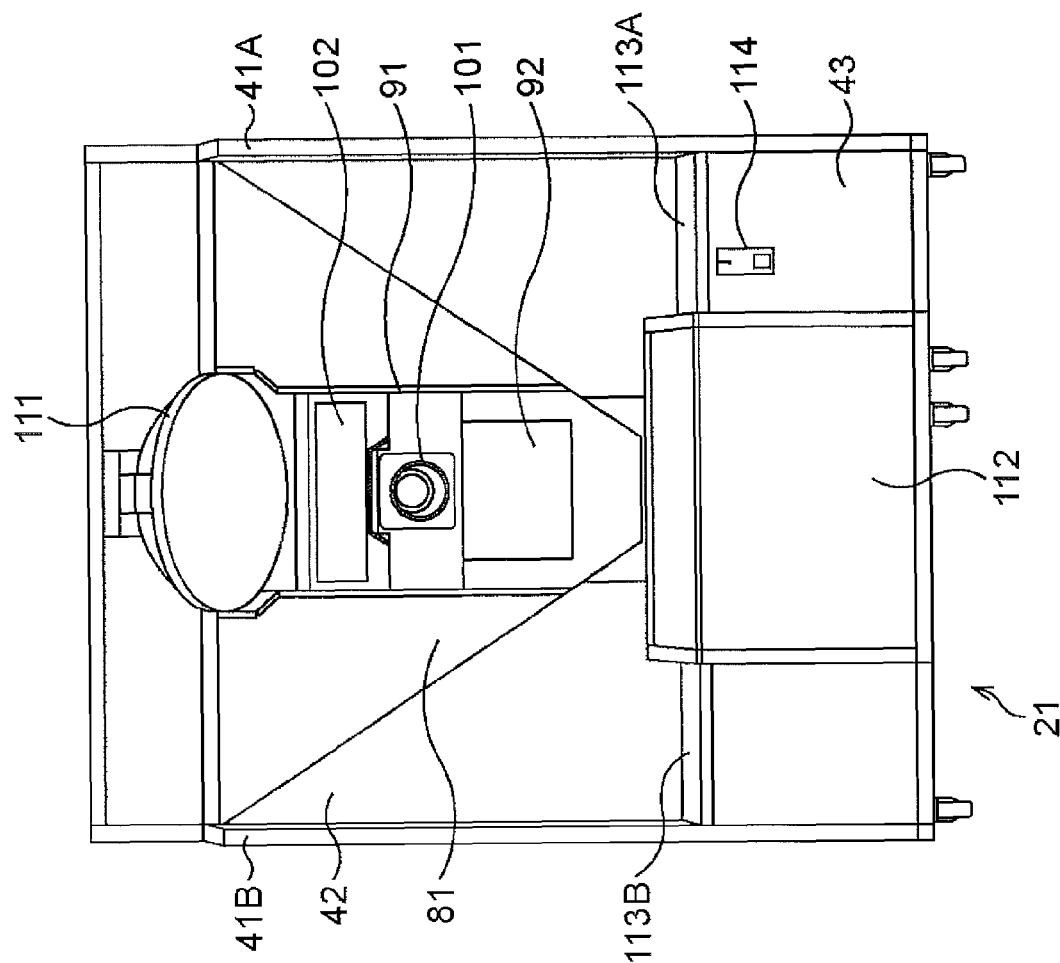
FIG. 4 is a diagram illustrating a configuration example of a shooting portion.

FIG. 4 is a diagram illustrating a configuration example of a front of the shooting portion 21. The shooting portion 21 is configured such that the side surface panel 41A, the side surface panel 41B, and a front panel 42 are attached to a base portion 43 having a box like shape.

A protruding portion 81 is formed on the center of the front panel 42. The protruding portion 81 has a surface that is an upside-down isosceles trapezoid with a ratio of an upper base: a lower base being approximately 1:5, and the length of the lower base being the same as the breadth of the front panel 42. A camera unit 91 is provided approximately in the center of the protruding portion 81, and a touch panel monitor 92 is provided below the camera unit 91. The camera unit 91 is configured from a camera 101 and a front strobe 102.

The camera 101 is, for example, a single-lens reflex camera, and is attached to an interior of the camera unit 91 such that a lens is exposed. The camera 101 includes an imaging device such as a charge coupled device (CCD), and shoots the user in the shooting space A1. A moving image captured by the camera 101 is displayed in the touch panel monitor 92 in real time. A still image captured by the camera 101 at predetermined timing such as when the shooting is instructed by the user is stored as a shot image.

The front strobe 102 provided above the camera 101 includes a laterally long rectangular light-emitting surface formed of a milky white acrylic plate. The front strobe 102 emits light in accordance with the shooting by the camera 101, thereby to irradiate the vicinity of a face of the user as an object from the front.

Note that, as the milky white acrylic plate provided as the light-emitting surface of the front strobe 102, one having a high degree of transparency is used. Accordingly, the degree of diffusion of light by the light emission of the front strobe 102 can be suppressed, compared with a case of using one having a low degree of transparency as the milky white acrylic plate, and the user can be irradiated with a larger amount of light.

The touch panel monitor 92 provided below the camera unit 91 is configured from a monitor such as a liquid crystal display (LCD), and a touch panel layered thereto. The touch panel monitor 92 has a function as a live view monitor that displays a moving image captured by the camera 101, and a function to display various graphical user interfaces (GUIs) and to receive a selection operation of the user. The moving image (live view) captured by the camera 101 or the shot image is displayed in the touch panel monitor 92.

An upper strobe 111, a curved light-emitting surface of which faces the user, is installed above the camera unit 91. The upper strobe 111 emits light in accordance with the shooting by the camera 101, thereby irradiating the user from above.

A foot strobe 112 that irradiates the lower half of the body and the foot of the user is provided in the center of the base portion 43, and a coin insertion/return slot 114 through which the user inserts coins is provided in a right side of a vertical surface of the foot strobe 112.

Spaces 113A and 113B are formed at right and left portions on an upper surface of the base portion 43. The spaces 113A and 113B are formed to interpose an upper surface of the foot strobe 112. The spaces 113A and 113B are used as baggage storage places where the user who performs the shooting places hand baggage, and the like. A speaker that outputs voice guidance of the shooting processing, background music (BGM), a sound effect, and the like is provided in the vicinity of the ceiling of the front panel 42.

[Configuration of Background Portion]

Figure 5:
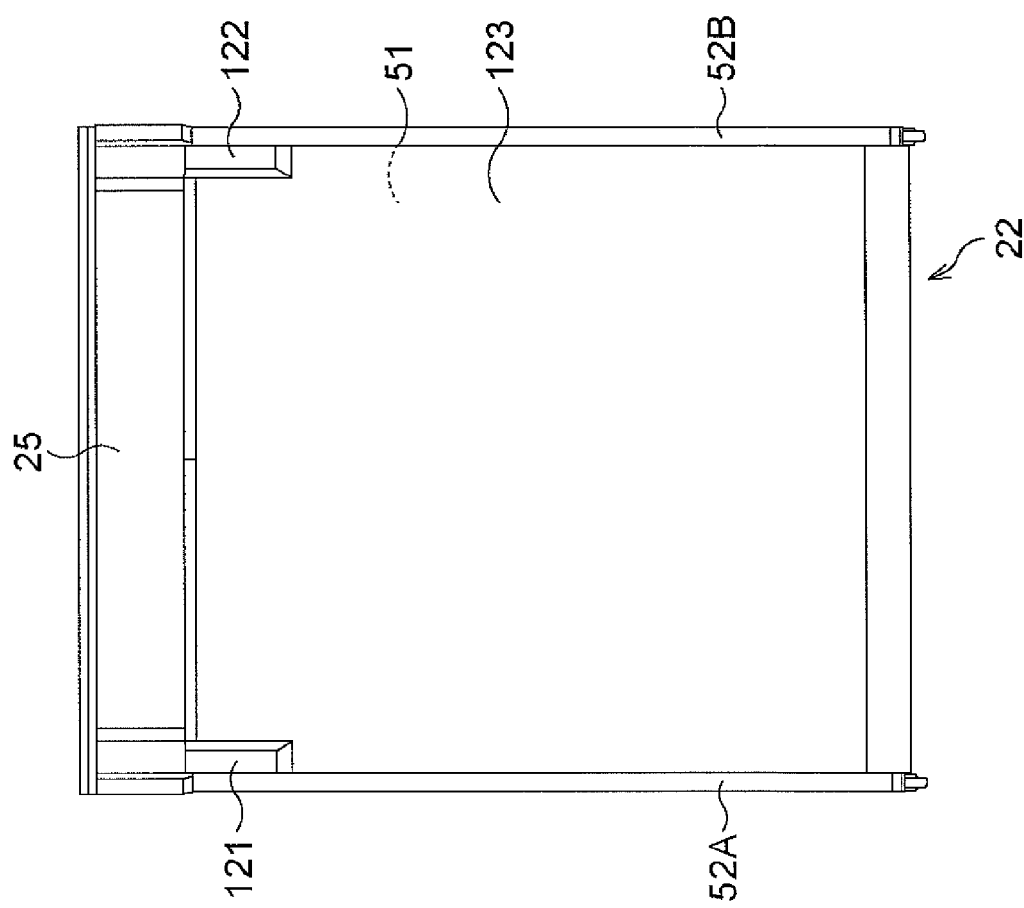
FIG. 5 is a diagram illustrating a configuration example of background portion.

FIG. 5 is a diagram illustrating a configuration example of a shooting space A1 side of the background portion 22.

As described above, the background curtain unit 25 is provided above the back surface panel 51.

A back surface right strobe 121 that irradiates the user who performs the shooting processing in the shooting space A1 from a rear right side is attached above the back surface panel 51 on an entrance G1 side (the left side in the drawing). Further, a back surface left strobe 122 that irradiates the user who performs the shooting processing in the shooting space A1 from a rear left side is attached above the back surface panel 51 on an entrance G2 side (the right side in the drawing).

Further, a back surface curtain 123 is affixed to a surface of the back surface panel 51 on a shooting space A1 side (the front side in the drawing). The color of the back surface curtain 123 is a white-based color, similarly to studios and the like where shooting of models of fashion magazines and the like is performed. Accordingly, a shadow more easily appears in the background of the object, and stereoscopic effects can be emphasized, in the shot image obtained by the shooting. Here, the white-based color includes not only white but also colors close to white (to be specific, gray close to white, bluish gray close to white, and the like).

In the photo sticker creation game by the photo sticker creating device 1 of the present invention, shooting for applying chroma key processing and shooting not applying the chroma key processing are performed, as described below. Therefore, the color of the back surface curtain 123 and the color of the chroma key curtain are made different, whereby shooting that suits each purpose can be performed.

[Configuration of Editing Unit]

Figure 7:
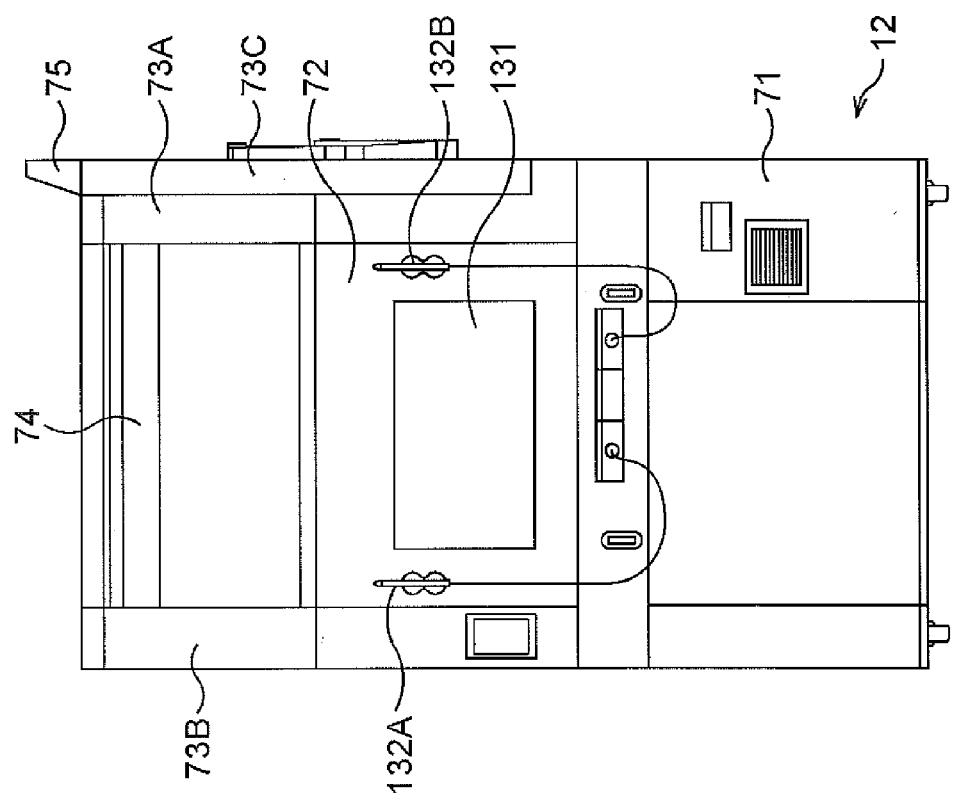
FIG. 7 is a diagram illustrating a configuration example of an editing unit.

FIG. 7 is a diagram illustrating a configuration example of the front surface side (an editing space A2-1 side) of the editing unit 12.

A tablet built-in monitor 131 is provided in a nearly center of the slope surface 72. A touch pen 132A is provided on the left side, and a touch pen 132B is provided on the right side, interposing the tablet built-in monitor 131.

The tablet built-in monitor 131 is configured such that a tablet into which an operation input can be performed using the touch pen 132A or the touch pen 132B is superimposed on a monitor such as an LCD. An editing screen is displayed in the tablet built-in monitor 131, for example. The editing screen is a screen used for editing of the shot image. When editing work is simultaneously performed by two persons, the touch pen 132A is used by the user who stands on the left side facing the tablet built-in monitor 131, and the touch pen 132B is used by the user who stands on the right side facing the tablet built-in monitor 131.

Figure 8:
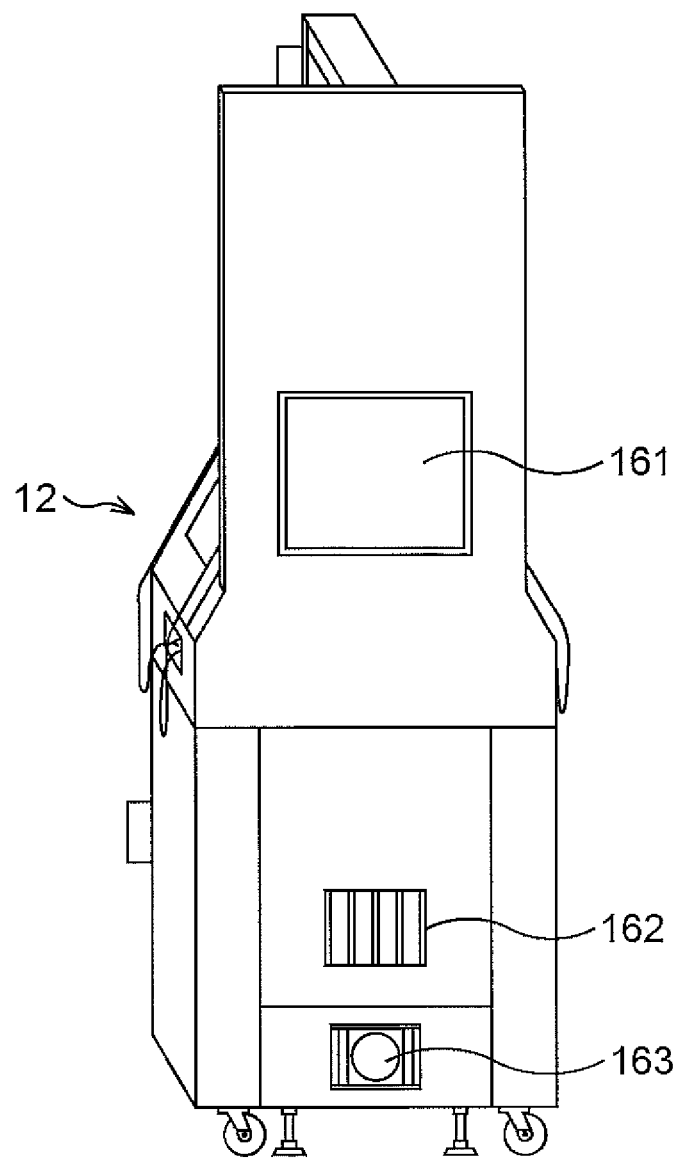
FIG. 8 is a diagram illustrating a configuration example of a right side surface of the editing unit.

FIGS. 8 and 9 are diagrams illustrating configuration examples of the right side surface of the editing unit 12.

A tablet built-in monitor 161 is provided on the right side surface of the editing unit 12. A screen used when the user uses the post-service function is displayed in the tablet built-in monitor 161.

A sticker sheet outlet 162 is provided below the tablet built-in monitor 161. A printer is provided in an interior of the editing unit 12. Images in which the user in the editing space A2-1 appears, or images in which the user in the editing space A2-2 appears are printed on a sticker sheet with a predetermined layout, and the sticker sheet is discharged through the sticker sheet outlet 162. A speaker 163 that outputs voice guidance, BGM, a sound effect, and the like, which realize the post-service function, is provided below the sticker sheet outlet 162.

[Internal Configuration of Photo Sticker Creating Device]

Figure 10:
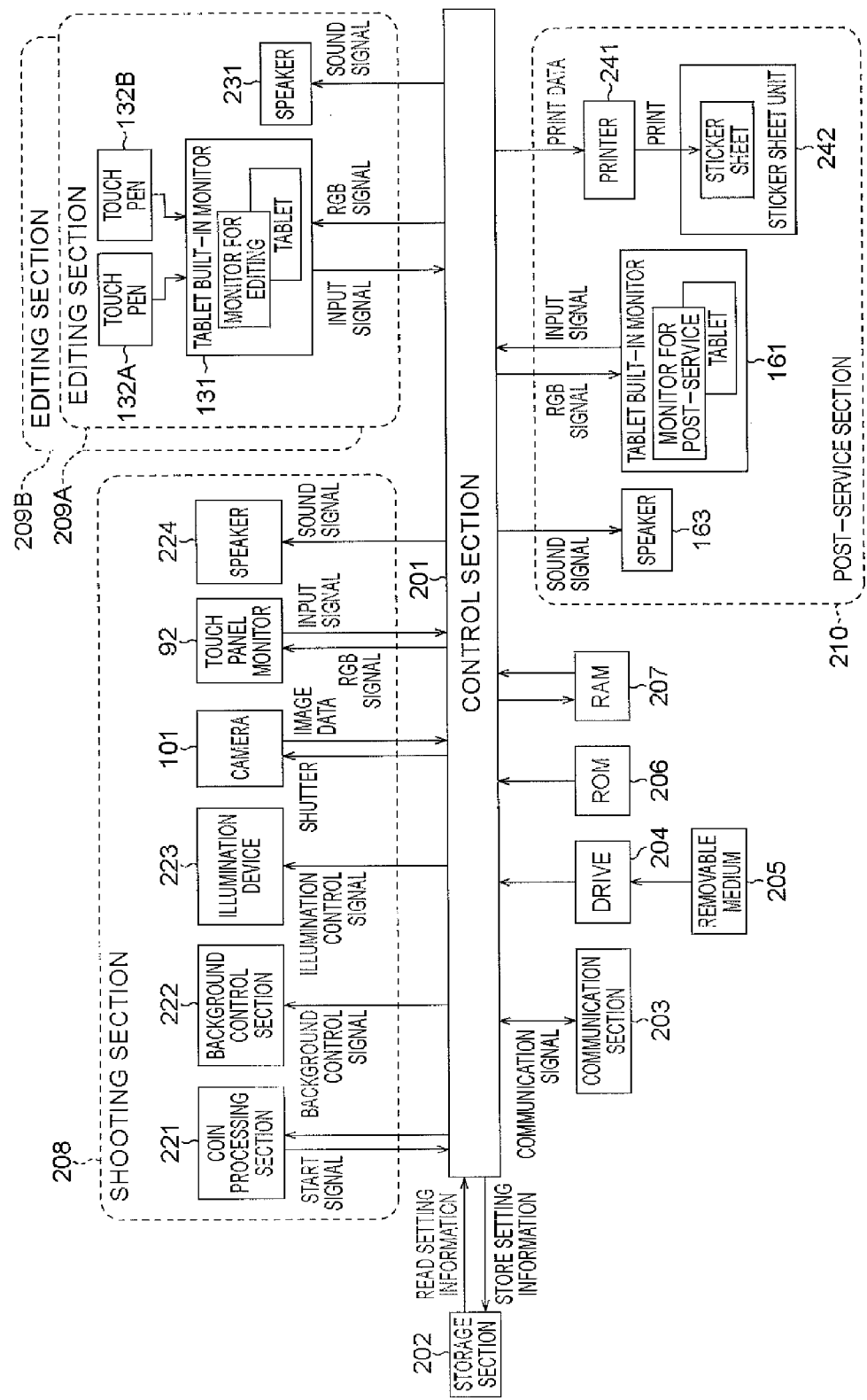
FIG. 10 is a block diagram illustrating an internal configuration example of the photo sticker creating device.

FIG. 10 is a block diagram illustrating an internal configuration example of the photo sticker creating device 1. The same configuration as the above-described configuration is denoted with the same reference sign. Overlapping description is appropriately omitted.

A control section 201 is formed of a central processing unit (CPU), and the like, and executes a program stored in a read only memory (ROM) 206 or a storage section 202 to control the entire operation of the photo sticker creating device 1. A storage section 202, a communication section 203, a drive 204, the ROM 206, and a random access memory (RAM) 207 are connected to the control section 201. Configurations of a shooting section 208, an editing section 209A, an editing section 209B, and a post-service section 210 are also connected to the control section 201.

The storage section 202 is formed of a non-volatile storage medium, such as a hard disk or flash memory, and stores various types of setting information supplied from the control section 201, and the like. The information stored in the storage section 202 is appropriately read by the control section 201.

The communication section 203 is an interface of a network, such as the Internet, and performs communication with an external device according to the control by the control section 201. The communication section 203 transmits a shot image and an edited image to a server. An image transmitted from the communication section 203 is allocated a storage area of a predetermined URL and stored in the server, and is displayed in a display of an accessed mobile terminal. In this way, the image provided to the mobile terminal is sometimes used as a standby screen of the mobile terminal, sometimes exchanged with friends, or sometimes posted to a site that provides a service (may also be called community) to report a current status, such as a social networking service (SNS) or a blog.

A removable medium 205 formed of an optical disk or semiconductor memory is appropriately attached to the drive 204. A computer program or data read from the removable medium 205 by the drive 204 is supplied to the control section 201, and is sometimes stored in the storage section 202 or sometimes installed.

A program executed in the control section 201 and data are stored in the ROM 206. The RAM 207 temporarily stores the data and the program processed by the control section 201.

The shooting section 208 performs shooting processing intended for the user in the shooting space A1. The shooting section 208 is configured from a coin processing section 221, a background control section 222, an illumination device 223, a camera 101, the touch panel monitor 92, and a speaker 224.

The coin processing section 221 detects insertion of a coin to the coin insertion/return slot 114. When having detected insertion of coins of a predetermined amount of money such as 400 yen, the coin processing section 221 outputs a start signal that indicates the fact of the insertion to the control section 201.

The background control section 222 controls raising and lowering of the background curtain (chroma key curtain) by the background curtain unit 25 according to a background control signal supplied from the control section 201.

The illumination device 223 is each strobe in the shooting space A1, and emits light according to an illumination control signal supplied from the control section 201. The front strobe 102, the upper strobe 111, and the foot strobe 112 of the shooting portion 21, and the back surface right strobe 121 and the back surface left strobe 122 of the background portion 22 are provided in the shooting space A1, in addition to the strobe of the ceiling strobe unit 24.

The camera 101 performs shooting according to the control by the control section 201, and outputs an image obtained by the shooting to the control section 201.

The editing section 209A performs editing processing intended for the user in the editing space A2-1. The editing section 209A is configured from a tablet built-in monitor 131, touch pens 132A and 132B, and a speaker 231. The editing section 209B has the same configuration as the editing section 209A, and performs editing processing intended for the user in the editing space A2-2.

The tablet built-in monitor 131 displays an editing screen according to the control by the control section 201, and detects an operation of the user to the editing screen. A signal that indicates content of the operation of the user is supplied to the control section 201, and editing of a shot image to be edited is performed.

The post-service section 210 performs post-service processing intended for the user in the post-service space A3. The post-service processing is processing to provide the above-described post-service function to the user. The post-service section 210 is configured from a tablet built-in monitor 161, a speaker 163, and a printer 241. A sticker sheet unit 242 is mounted to the printer 241.

The printer 241 prints shot images and edited images on a sticker sheet stored in the sticker sheet unit 242, based on print data supplied from the control section 201, and discharges the printed sheet to the sticker sheet outlet 162.

[Configuration of Control Section]

Figure 11:
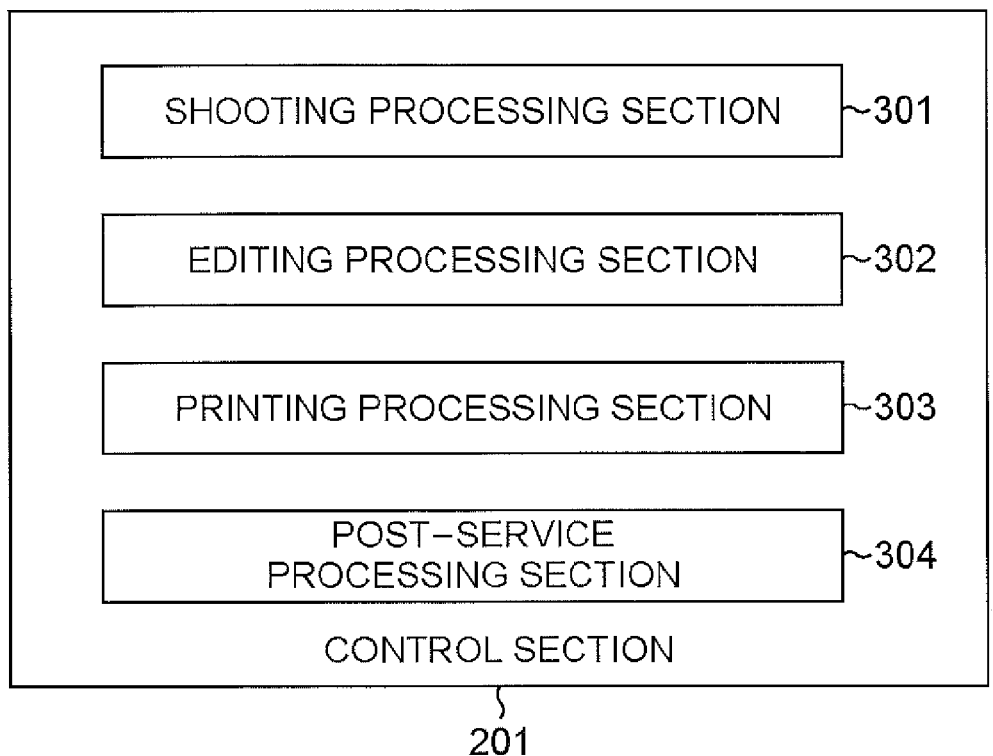
FIG. 11 is a block diagram illustrating a functional configuration example of a control section.

FIG. 11 is a block diagram illustrating a functional configuration example of the control section 201. A functional section illustrated in FIG. 11 is realized by execution of a predetermined program by the CPU in the control section 201.

To be specific, in the control section 201, a shooting processing section 301, an editing processing section 302, a printing processing section 303, and a post-service processing section 304 are realized.

The shooting processing section 301 controls sections of the shooting section 208 to perform pre-service processing and the shooting processing. The pre-service processing includes processing related to the charge inserted when the photo sticker creating device 1 is used, and is performed before the shooting processing. The editing processing section 302 controls sections of the editing section 209A and the editing section 209B to perform the editing processing. The printing processing section 303 controls the printer 241 of the post-service section 210 to perform printing processing. The post-service processing section 304 controls the tablet built-in monitor 161 of the post-service section 210, and the like to perform the post-service processing.

[Configuration Example of Editing Processing Section]

Figure 12:
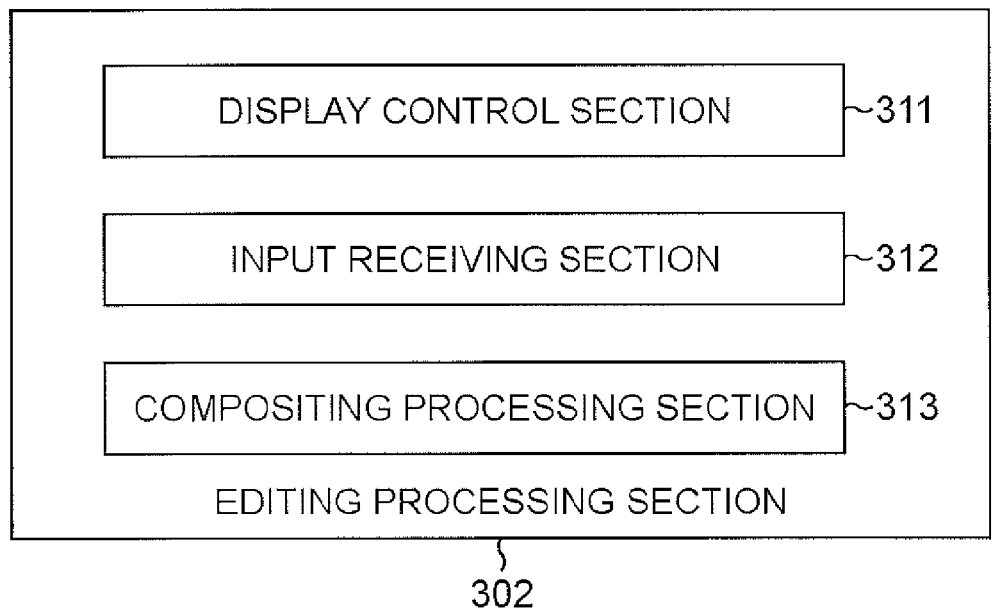
FIG. 12 is a block diagram illustrating a functional configuration example of an editing processing section.

FIG. 12 is a block diagram illustrating a functional configuration example of the editing processing section 302. The photo sticker creating device 1 functions as an image editing device by an operation of the editing processing section 302.

The editing processing section 302 performs the editing processing to allow the user to select one shot image of the plurality of shot images obtained by the shooting processing, as an editing target image. Next, the editing processing section 302 allows the user to select an image for compositing, which is prepared in advance, and is to be composited to the selected editing target image. Then, the editing processing section 302 composites the selected image for compositing to the editing target image. The editing processing section 302 outputs a plurality of composite images obtained as described above, as edited images.

Here, the image for compositing includes a pen image that is an image made of lines to be composited corresponding to a locus of a drawing input by the user, a stamp image that is an image of graphics and characters to be composited to an arbitrary position of the shot image, and a frame image that is an image of patterns and designs to be composited to a predetermined position of the shot image. That is, the editing processing section 302 composites the pen image, the stamp image, or the frame image to the shot image based on an editing input by the user, thereby to generate a composite image. These images for compositing are stored in the storage section 202. Note that, hereinafter, these images for compositing are appropriately referred to as editing tools.

The editing processing section 302 is configured from a display control section 311, an input receiving section 312, and a compositing processing section 313.

The display control section 311 controls display of the tablet built-in monitors 131 in the editing sections 209A and 209B. For example, the display control section 311 displays the shot image in a predetermined area of the editing screen displayed in the tablet built-in monitor 131 as an editing target image that serves as an object of an editing input, and displays a group of images for compositing made of a plurality of images for compositing to be composited to the editing target image on the editing screen, in a palette for editing described below.

At this time, the display control section 311 displays an image for compositing based on a state of the user, in the palette for editing, as needed as the image for compositing. Here, the state of the user indicates, for example, a state of the user at the time of using the photo sticker creating device 1, such as who the user plays the photo sticker creating device 1 with (a relationship between the users), what purpose the user comes to play (a purpose of behavior of the users), and the like.

The input receiving section 312 receives operation inputs to the tablet built-in monitor 131 using the touch pens 132A and 132B by the user. For example, the input receiving section 312 receives selection of the image for compositing to be composited to the editing target image from the group of images for compositing displayed in the palette for editing.

The compositing processing section 313 performs compositing processing of compositing the image for compositing selected by the user from the group of images for compositing displayed in the palette for editing, to the editing target image.

[Operation of Photo Sticker Creating Device]

Next, an operation of the photo sticker creating device 1 will be described.

Figure 13:
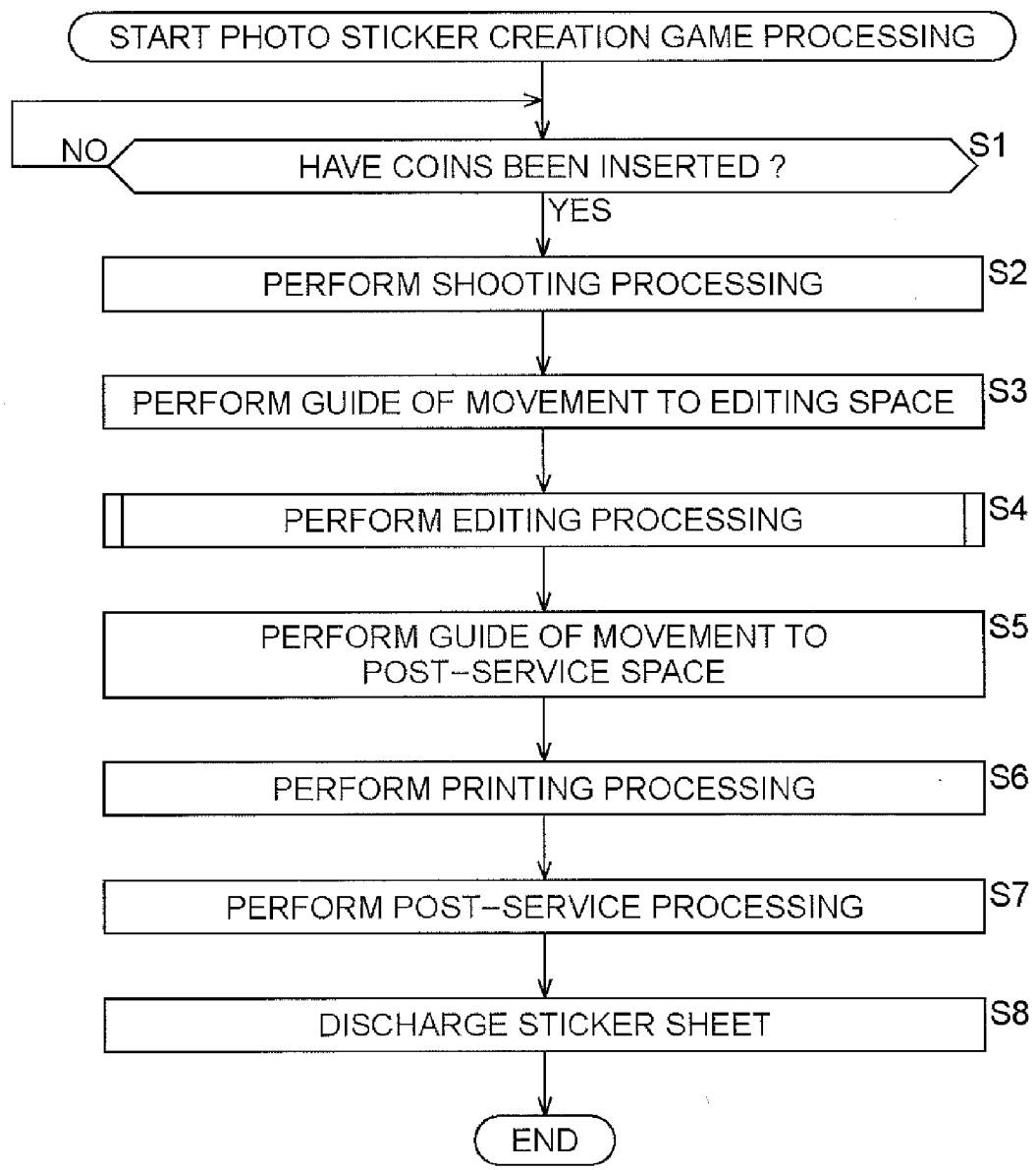
FIG. 13 is a flowchart describing an example of a flow of photo sticker creation game processing.

First, processing of the photo sticker creating device 1 that provides a photo sticker creation game will be described with reference to the flowchart of FIG. 13.

In step S1, the shooting processing section 301 of the photo sticker creating device 1 determines whether coins of a predetermined amount of money have been inserted based on a signal supplied from the coin processing section 221, and waits until determining the coins have been inserted. At this time, the shooting processing section 301 may perform the pre-service processing that is processing of outputting an image moving picture or guidance of a photo sticker creation game to the user in the shooting space A1 before shooting. The pre-service processing is performed by displaying of a screen in the touch panel monitor 92 by the shooting processing section 301, or outputting of a sound from the speaker 224.

In step S2, when having determined that the coins have been inserted in step S1, the shooting processing section 301 performs the shooting processing. In the shooting processing, shooting is performed with the user in the shooting space A1 as an object.

Although detailed description of the shooting processing is omitted, shooting based on a shooting course selected from a plurality of shooting courses by the user is performed in the shooting processing. As the shooting courses, a beauty course for capturing the user prettily and beautifully, and an edgy course for capturing the user in a more stylish manner.

When the beauty course has been selected as the shooting course, the shooting processing section 301 causes the background curtain unit 25 to lower the chroma key curtain, and performs chrome key shooting for applying the chroma key processing to the shot image. When the edgy course has been selected, the shooting processing section 301 performs the shooting in which the chroma key processing is not applied, in a state where the curtain is kept up and the background curtain unit 25 does not lower the chrome key curtain.

In step S3, the shooting processing section 301 guides the user in the shooting space 1 to move to the editing space A2-1 or the editing space A2-2. The guide of movement to the editing space A2-1 or the editing space A2-2 is performed by displaying of a screen in the touch panel monitor 92, or by outputting of a sound from the speaker 224.

In step S4, the editing processing section 302 controls the editing section 209A or the editing section 209B corresponding to the editing space, of the editing space A2-1 and the editing space A2-2, the editing space being the destination of the user who has completed the shooting processing, to perform the editing processing. Details of the editing processing will be described below with reference to the flowchart of FIG. 14.

In step S5, the editing processing section 302 guides the user who has completed the editing processing to move to the post-service space A3. The guide of movement to the post-service space A3 is performed by displaying a screen in the tablet built-in monitor 131, or by outputting of a sound from the speaker 231.

In step S6, the printing processing section 303 performs printing processing. The shot images or the edited images are printed on a sticker sheet according to a layout selected by the user by the printing processing.

In step S7, the post-service processing section 304 performs the post-service processing with respect to the user who waits for completion of printing. The post-service processing section 304 performs processing of transmitting the shot image or the edited image to the mobile terminal, and the like as the post-service processing.

In step S8, when the printing has been completed, the post-service processing section 304 discharges the sticker sheet on which the images have been printed through the sticker sheet outlet 162, and terminates the processing.

[Details of Editing Processing]

Next, details of the editing processing performed in step S4 of FIG. 13 will be described with reference to the flowchart of FIG. 14.

In step S51, the display control section 311 of the editing processing section 302 displays a profile input screen in the tablet built-in monitor 131. The profile input screen is a screen for allowing the user to input a profile. On the profile input screen, a sentence expressing a question to the user (a question inquiring about the state of the user), and candidates (alternatives) of a response to the question are displayed. Any of the candidates of a response displayed on the profile input screen is selected by the user as a profile of the user.

Figure 15:
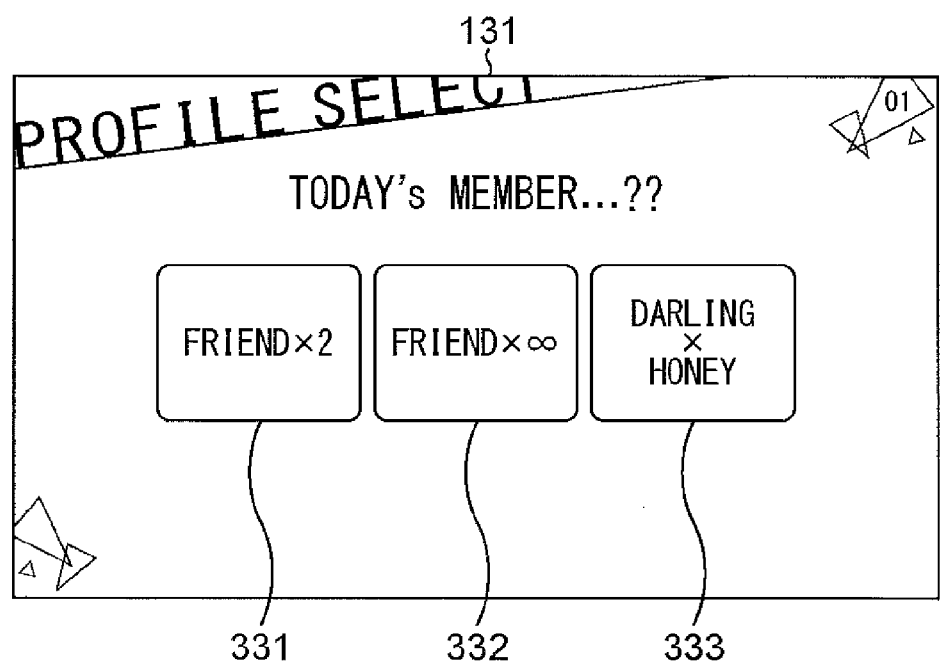
FIG. 15 is a diagram illustrating an example of a profile input screen.

FIG. 15 is a diagram illustrating an example of the profile input screen.

A sentence expressing a question inquiring the relationship between the users who are playing together with the photo sticker creating device 1 is displayed in a central upper portion on the profile input screen illustrated in FIG. 15. The sentence means, for example, "who have you taken a picture with today?". Response buttons 331 to 333 as the alternatives expressing responses (relationships between the users) to the question are displayed under the sentence. The response button 331 is a button selected when the response to the question is "two friends", the response button 332 is a button selected when the response to the question is "three or more friends", and the response button 333 is a button selected when the response to the question is "darling and honey", that is a couple.

When any of the response buttons 331 to 333 has been selected by the user on the profile input screen illustrated in FIG. 15, and the input receiving section 312 has received the selection, the display control section 311 displays a profile input screen that indicates a question based on the response expressed by the response button selected by the user, in the tablet built-in monitor 131.

Figure 16:
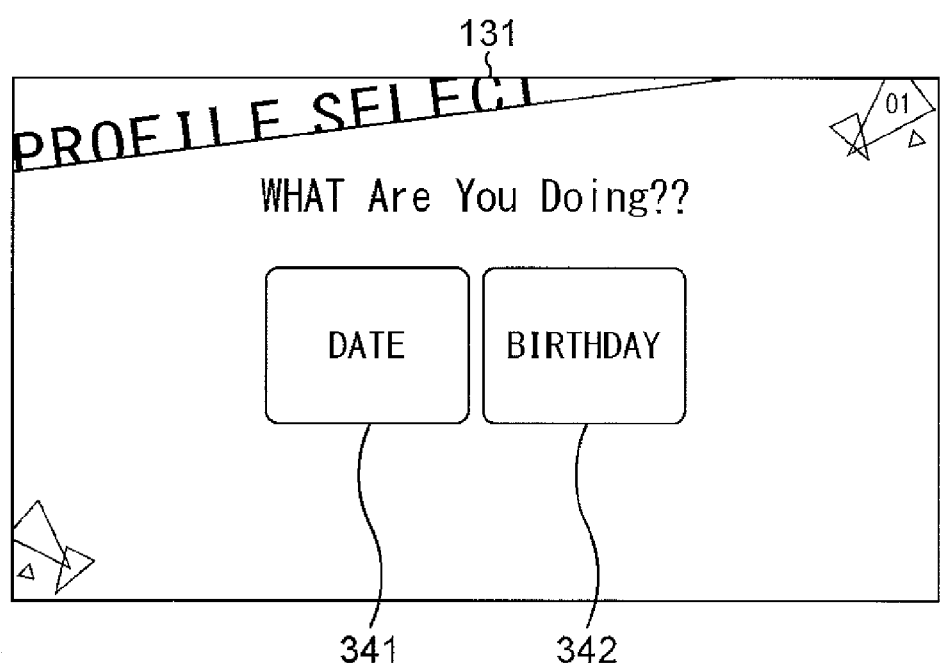
FIG. 16 is a diagram illustrating an example of the profile input screen.

To be specific, when the response button 331 or 332 has been selected, that is, the relationship between the users is friends, a profile input screen illustrated in FIG. 16 is displayed in the tablet built-in monitor 131.

A sentence expressing a question inquiring about the purpose of behavior of the users is displayed in a central upper portion of the profile input screen illustrated in FIG. 16. The sentence means, for example, "what are you doing today?". Response buttons 341 and 342 as alternatives expressing responses (purposes of behavior of the user) to the question are displayed under the sentence. The response button 341 is a button selected when the response to the question is a "date".

Further, the response button 342 is a button selected when the response to the question is a "birthday" (for example, participation to a gathering commemorating the "birthday" or an event for celebration).

As described above, when the relationship between the users is friends, as the purpose of behavior of the users, either the "date" or the "birthday" is selectable.

Further, participation to seasonal events is included as one of the purposes of behavior of the user, whereby limited time events may be prepared as the responses to the question inquiring about the purpose of behavior of the users, in addition to the "date" and the "birthday". To be specific, when the day on which the users use the photo sticker creating device 1 (hereinafter, referred to as the date of use) is any day from October 12 to October 31, "Halloween" is prepared, when the date of use is any day from December 1 to December 25, "Christmas" is prepared, when the date of use is any day from December 25 to January 31, "New Year" is prepared, and when the date of use is any day from February 1 to February 14, "Valentine" is prepared, as a response.

Figure 17A:
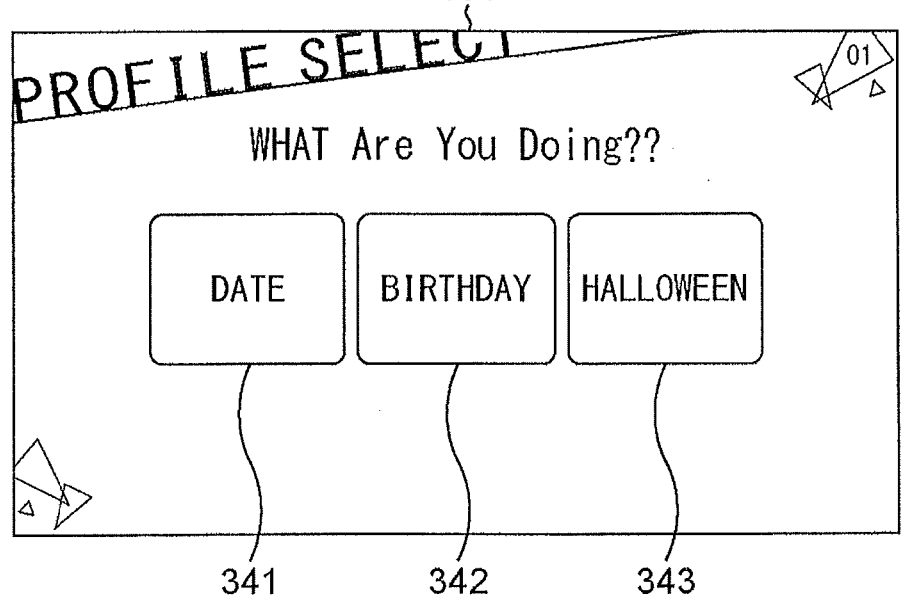
FIGS. 17A and 17B are diagrams illustrating examples of the profile input screen.

For example, when the date of use is October 30, a profile input screen illustrated in FIG. 17A is displayed in place of the profile input screen illustrated in FIG. 16. On the profile input screen illustrated in FIG. 17A, a response button 343 selected when the response to the question is "Halloween" is displayed as an alternative expressing a response to the question, in addition to the response buttons 341 and 342.

Figure 17B:
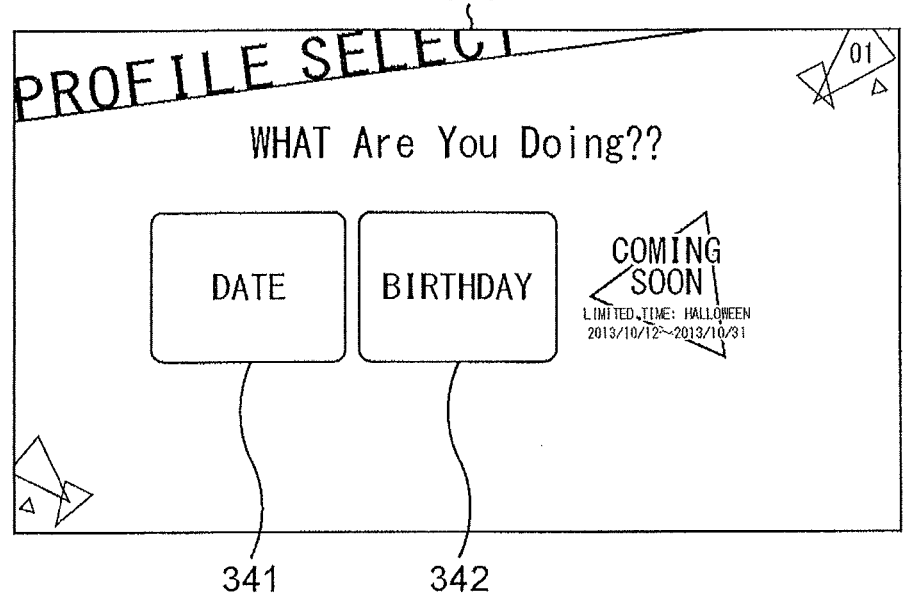

Note that display indicating a limited time event will be selected soon is displayed in a position where the response button 343 is to be displayed, on days outside the period of the limited time event and several days before entering the period, as illustrated in FIG. 17B.

Figure 18:
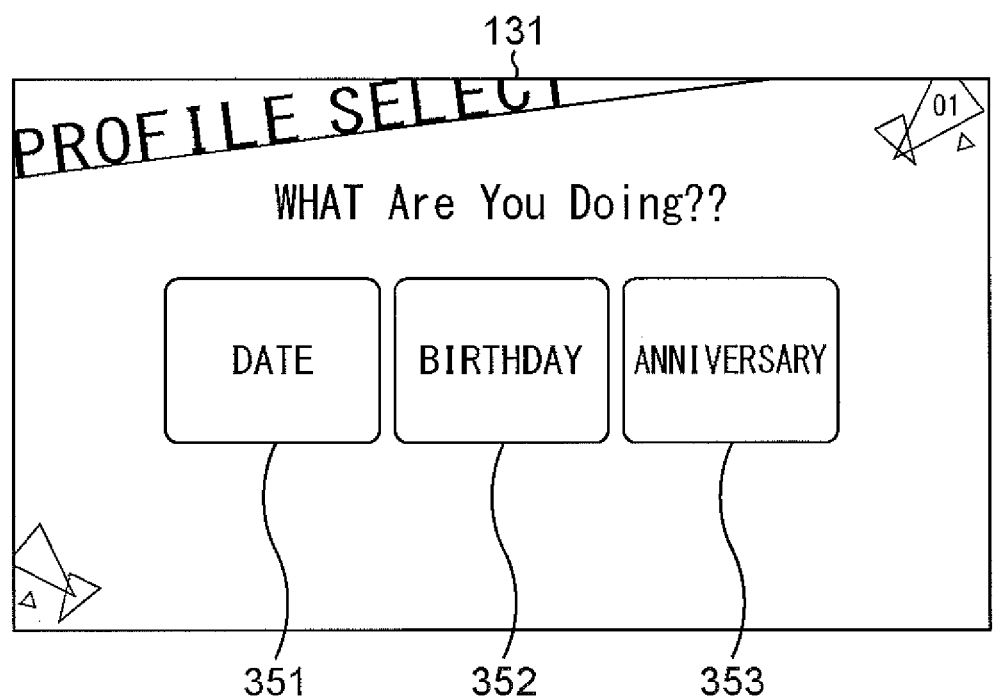
FIG. 18 is a diagram illustrating an example of the profile input screen.

Meanwhile, when the response button 333 has been selected on the profile input screen illustrated in FIG. 15, that is, when the relationship between the users is a couple, a profile input screen illustrated in FIG. 18 is displayed in the tablet built-in monitor 131.

The sentence expressing a question inquiring about the purpose of behavior of the users is displayed in a central upper portion of the profile input screen illustrated in FIG. 18. The sentence means, for example, "what are you doing today?". Response buttons 351 to 353 as alternatives expressing responses (purposes of behavior of the user) to the question are displayed under the sentence. The response button 351 is a button selected when the response to the question is the "date", the response button 352 is a button selected when the response to the question is the "birthday", and the response button 353 is a button selected when the response to the question is a "memorial day".

As described above, when the relationship between the users is a couple, as the purposes of behavior of the user, one of the "memorial day", the "date", and the "birthday" is selectable.

Note that, even in a case where the relationship between the users is a couple, the limited time events may be prepared as the responses to the question inquiring about the purpose of behavior of the users, in addition to the "date", the "birthday", and the "memorial day".

Figure 19A:
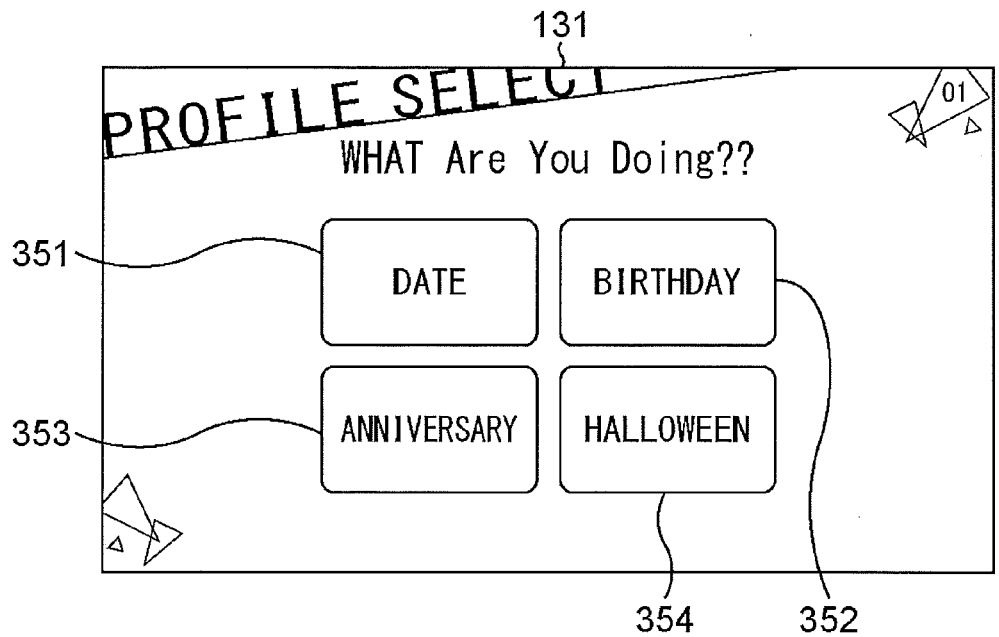
FIGS. 19A and 19B are diagrams illustrating examples of the profile input screen.

For example, when the date of use is October 30, a profile input screen illustrated in FIG. 19A is displayed in place of the profile input screen illustrated in FIG. 18. On the profile input screen illustrated in FIG. 19A, a response button 354 selected when the response to the question is "Halloween" is displayed as an alternative expressing a response to the question, in addition to the response buttons 351 to 353.

Figure 19B:
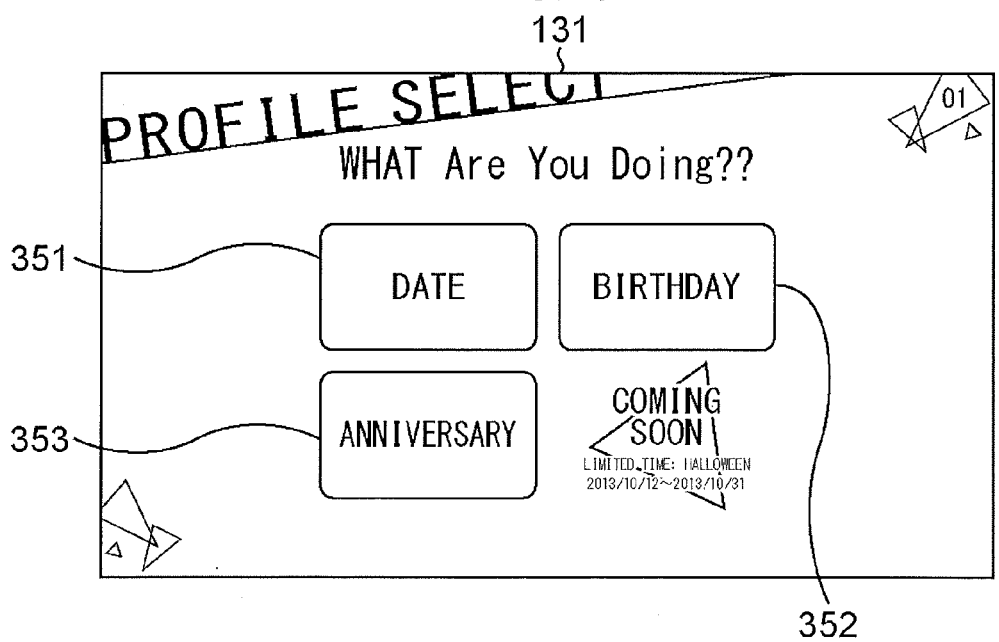

Note that display indicating a limited time event will be selected soon is displayed in a position where the response button 354 is to be displayed, on days outside the period of the limited time event and several days before entering the period, as illustrated in FIG. 19B.

When any of the response buttons expressing the purposes of behavior of the user has been selected on the profile input screen displayed as described above, and the input receiving section 312 has received the selection, the processing proceeds to step S52. Note that the response selected by the user on the profile input screen is only one regardless of the number of users, as described above.

Further, in the above-described example, the number of questions to the user displayed on the profile input screen is two, which is small. Therefore, the user may input the candidates of a response to the questions.

In step S52, the display control section 311 displays a name input screen in the tablet built-in monitor 131. Keys, buttons, and the like for allowing the users to input respective names are displayed on the name input screen.

At this time, when the response button 331 or 333 has been selected on the profile input screen illustrated in FIG. 15, the users are two friends or a couple. Therefore, the name input screen for receiving inputs of names of two users is displayed. Further, when the response button 332 has been selected on the profile input screen illustrated in FIG. 15, the users are three or more friends. Therefore, for example, the name input screen for receiving inputs of names of three users is displayed.

In step S53, the editing processing section 302 determines whether the shooting has been performed with the beauty course in the shooting processing.

When having determined that the shooting has been performed with the beauty course in step S53, in step S54, the display control section 311 displays a background selection screen in the tablet built-in monitor 131. On the background selection screen, a plurality of images with various colors and patterns is displayed as background images, together with a message that prompts selection of a color of the background.

The background image is an image used as a background of the user appearing in the shot image. As described above, the shooting with the beauty course is performed in a state where the chrome key curtain is lowered. In the editing processing after the shooting processing with the beauty course is performed, a shot image in which the background image is composited to the background of the user by the chroma key processing is used as an image to be edited.

Note that, here, the background images of the number of shot images, for example, five background images are selected by the user. Alternatively, as the background images, a plurality of background image sets, the background image set being a set of five background images based on a predetermined theme, is displayed, and any of the background image sets may be selected.

In step S55, the compositing processing section 313 reads the five shot images from the storage section 202, and composites respective shot images and background images. That is, the compositing processing section 313 extracts a background area in the shot image, and performs the chrome key processing of compositing the background image to the extracted area, for the respective shot images.

Meanwhile, when having determined that the shooting has not been performed with the beauty course in step S53, that is, when the having determined that the shooting has been performed with the edgy course, the processing of steps S54 and S55 is skipped.

In step S56, the display control section 311 displays the editing screen in the tablet built-in monitor 131. On the editing screen, the shot image to which the background image has been composited, or the shot image read from the storage section 202 is displayed.

Figure 20:
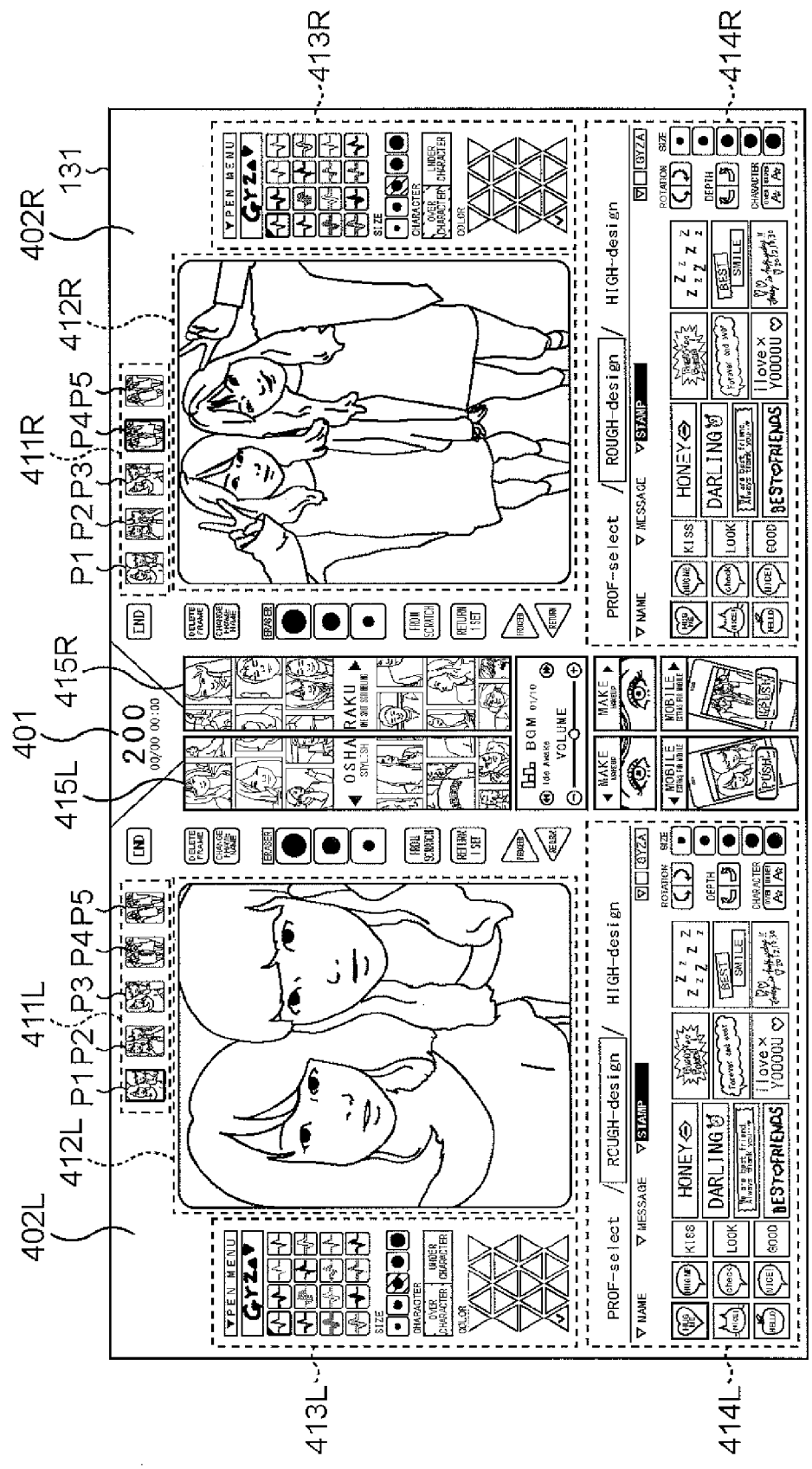
FIG. 20 is a diagram illustrating an example of an editing screen.

FIG. 20 is a diagram illustrating an example of the editing screen.

Basically, the editing screen is configured such that main configurations are symmetrically provided. An area 402L that is a left-half area is an area used by the user on the left side facing the tablet built-in monitor 131, and an area 402R that is a right-half area is an area used by the user on the right side facing the tablet built-in monitor 131. A remaining time of the editing processing, and the like are displayed in a central area 401. Note that the dashed lines surrounding respective areas of FIG. 20 are not displayed for real.

A thumbnail image display area 411L in a central upper portion of the area 402L is a display area of thumbnail images indicating the shot images. The user (the user on the left side facing the tablet built-in monitor 131) selects a thumbnail image displayed in the thumbnail image display area 411L, thereby to select the shot image to be edited.

In the example of FIG. 20, thumbnail images 21 to 25 indicating the five shot images are arranged in the order of shooting and displayed in the thumbnail image display area 411L, and a left-end thumbnail image P1 is selected, whereby the first shot image becomes an object to be edited.

A relatively large editing area 412L formed in an approximately center of the area 402L is a display area of the shot image selected as an object to be edited. In the example of FIG. 20, the thumbnail image P1 is selected from the thumbnail image display area 411L, whereby the first shot image is displayed. The user selects an editing tool using the touch pen 132A, and can perform editing of the shot image displayed in the editing area 412L.

A pen palette display area 413L on the left side of the editing area 412L is a display area of a pen palette used for selection of a pen image (pen tool) used for hand writing input. In the pen palette display area 413L, a plurality of buttons used for selection of a type of line, a thickness, and a color of the pen image is displayed.

Here, details of the pen palette displayed in the pen palette display area 413L will be described with reference to FIG. 21.

Figure 21:
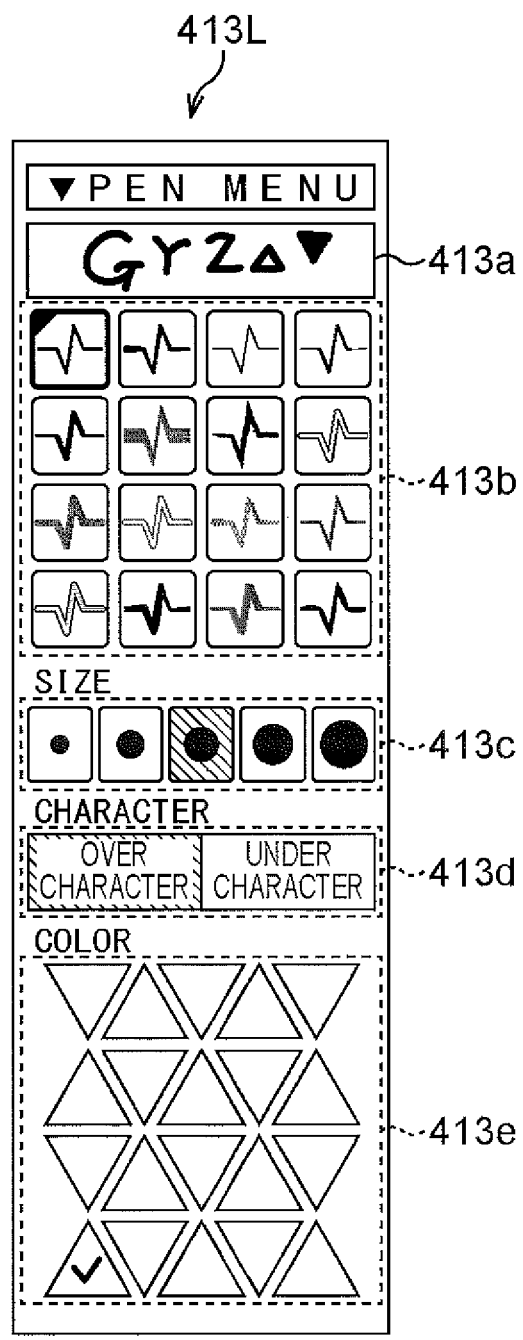
FIG. 21 is a diagram illustrating an example of a pen palette.

As illustrated in FIG. 21, the pen palette is configured from a pen sample display portion 413a, a pen icon display portion 413b, a pen size selection button 413c, an over character/under character selection button 413d, and a pen color palette 413e.

In such a pen palette, when a line type of the pen has been selected from the pen icon display portion 413b, the thickness of the pen has been selected from the pen size selection button 413c, and the color of the pen has been selected from the pen color palette 413e, by the user, a sample of the pen image with the selected line type, thickness, and color is displayed in the pen sample display portion 413a.

Further, the over character/under character selection button 413d is selected, whereby whether the pen image is composited over or under other editing tools (images for compositing) is selected.

In the pen icon display portion 413b, a selection anchor is displayed on an icon of the selected line type, and in the pen size selection button 413c, a button of the selected thickness is highlighted. Further, in the over character/under character selection button 413d, a selected button is highlighted, and in the pen color palette 413e, a palette of the selected color is displayed with a check mark.

Note that, in a default state in which the editing screen is first displayed, the upper leftmost line type is selected in the pen icon display portion 413b, a middle thickness is selected in the pen size selection button 413c, the "over character" is selected in the over character/under character selection button 413d, and the lower leftmost color (for example, black) is selected in the pen color palette 413e, as illustrated in FIG. 21.

Further, when another editing tool has been selected in a palette for editing described below, in a state where a predetermined line type, thickness, color, and over or under of the pen image are selected in the pen palette, while display of the selection anchor in the pen icon display portion 413b, and the highlights of the pen size selection button 413c and the over character/under character selection button 413d become inactive, display of the check mark in the pen color palette 413e is kept.

Note that, even when the pen palette and the palette for editing are alternately selected, the line type, the thickness, and the like selected in the pen palette, and a category, and the like selected in the palette for editing may be maintained to an immediately selected state, or may be returned to a default state where the editing screen is first displayed.

Note that, in the pen palette display area 413R, the above-described pen palette is similarly displayed.

Referring back to the description of FIG. 20, a palette for editing display area 414L under the editing area 412L is a display area of a palette for editing used for selection of various editing tools (images for compositing), such as stamp images. The images for compositing displayed in the palette for editing are divided into categories of "PROF-select", "ROUGH-design", and "HIGH-design", and tabs to which respective category names are attached are selected, whereby the images for compositing to be displayed in the palette for editing display area 414L can be switched.

In the example of FIG. 20, the "ROUGH-design" tab is selected, and selection buttons of the images for compositing belonging to the category of the "ROUGH-design" are displayed.

A one touch editing button 415L in the area 401 is a button operated when one touch editing is performed. The one touch editing is a function to allow the user to perform the editing work of content set in advance with a single operation. Accordingly, the user who is not accustomed to the editing work (scribbling) can easily finish the editing work. The one touch editing button 415L is operated, whereby a plurality of images for compositing set in advance is collectively composited to the shot image.

The same configurations as the configurations of the area 402L are arranged in the area 402R used by the user who is on the right side facing the tablet built-in monitor 131 such that positions of the configurations of the area 402R become symmetrical to the positions of the configurations of the area 402L. In the example of FIG. 20, the thumbnail image P4 is selected from the thumbnail image display area 411R, whereby the fourth shot image becomes an object to be edited.

Note that the various types of images for compositing such as the stamp images displayed in the palettes for editing in the palette for editing display areas 414L and 414R are changed according to a response selected by the user on the profile input screen.

To be specific, when the "PROF-select" tab has been selected in the palette for editing, a stamp image based on a response selected by the user in the profile input screen, that is, the state of the user is displayed in the palette for editing. Hereinafter, the palette for editing display areas 414L and 414R are not distinguished, and are simply referred to as palette for editing display area 414.

Figure 22:
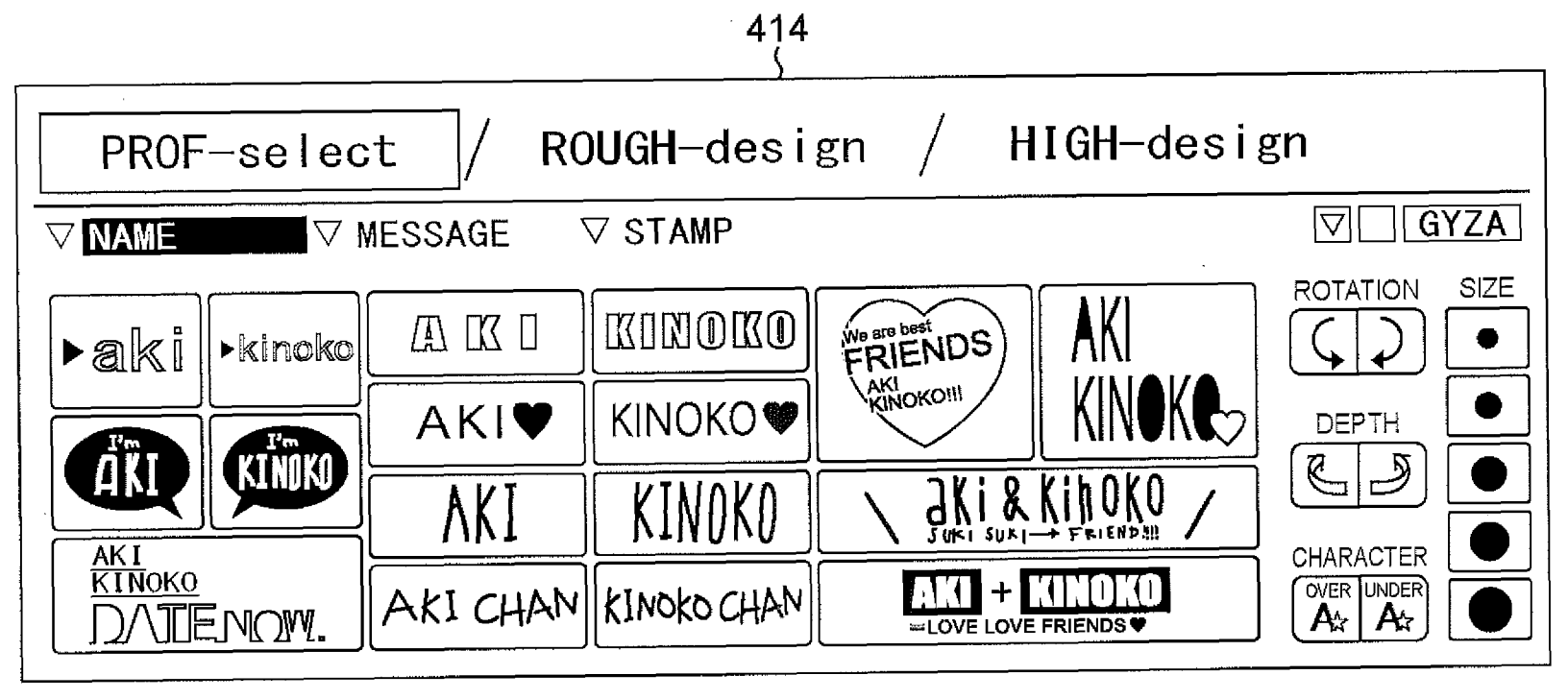

FIG. 22 illustrates an example of the palette for editing displayed in the palette for editing display area 414, where the "PROF-select" tab has been selected.

As illustrated in FIG. 22, the images for compositing displayed in the palette for editing where the category of "PROF-select" has been selected are divided into small categories of "NAME", "MESSAGE", and "STAMP", and tabs to which the respective small category names are attached are selected, whereby the images for compositing to be displayed in the palette for editing display area 414 can be further switched.

In the example of FIG. 22, the "NAME" tab is selected, and the images for compositing, of when the "two friends" has been selected as the response to the question inquiring about the relationship between the users, and the "date" has been selected as the response to the question inquiring about the purpose of behavior of the users, on the profile input screens, and names of the two users have been input on the name input screen, are displayed.

To be specific, in the example of FIG. 22, stamp images including one or both of respective names of the two friend users "AKI" and "KINOKO", stamp images respectively including phrases "We are best FRIENDS", "suki suki FRIEND!!!", "LOVE LOVE FRIENDS", which express that the two users are friends, in addition to the respective names, and stamp images including a phrase "DATE NOW", which expresses that the two users are on a date are displayed.

FIG. 23 illustrates another example of the palette for editing where the category of "PROF-select" has been selected.

In the example of FIG. 23, the "NAME" tab is selected, and the images for compositing, of when the "three or more friends" has been selected as the response to the question inquiring about the relationship between the users, and the "date" has been selected as the response to the question inquiring about the purpose of behavior of the users, on the profile input screens, and names of four users have been input on the name input screen, are displayed.

To be specific, in the example of FIG. 23, stamp images including one or all of respective names of the four friend users "AKI", "KINOKO", "NATSUMI", and "DOME", stamp images respectively including phrases "We are best FRIENDS", "suki suki→FRIEND!!!", and "=TODAY'S MEMBER", which express that the four users are friends, in addition to the respective names, and stamp images including a phrase "DATE NOW", which expresses that the four users are on a date are displayed.

As described above, the stamp images displayed in the palette for editing, where the "PROF-select" tab is selected, and the "NAME" tab is selected, are changed, according to the response selected by the user to the question inquiring about the relationship between the users, on the profile input screen (FIG. 15), the response selected by the user to the question inquiring about the purpose of behavior of the users, on the profile input screen (FIG. 16 or 18), and the names of the users input on the name input screen.

Note that the stamp images displayed in the palettes for editing illustrated in FIGS. 22 and 23 are all made of stamp images based on the relationship between the users. However, other stamp images may be mixed.

Figure 24:
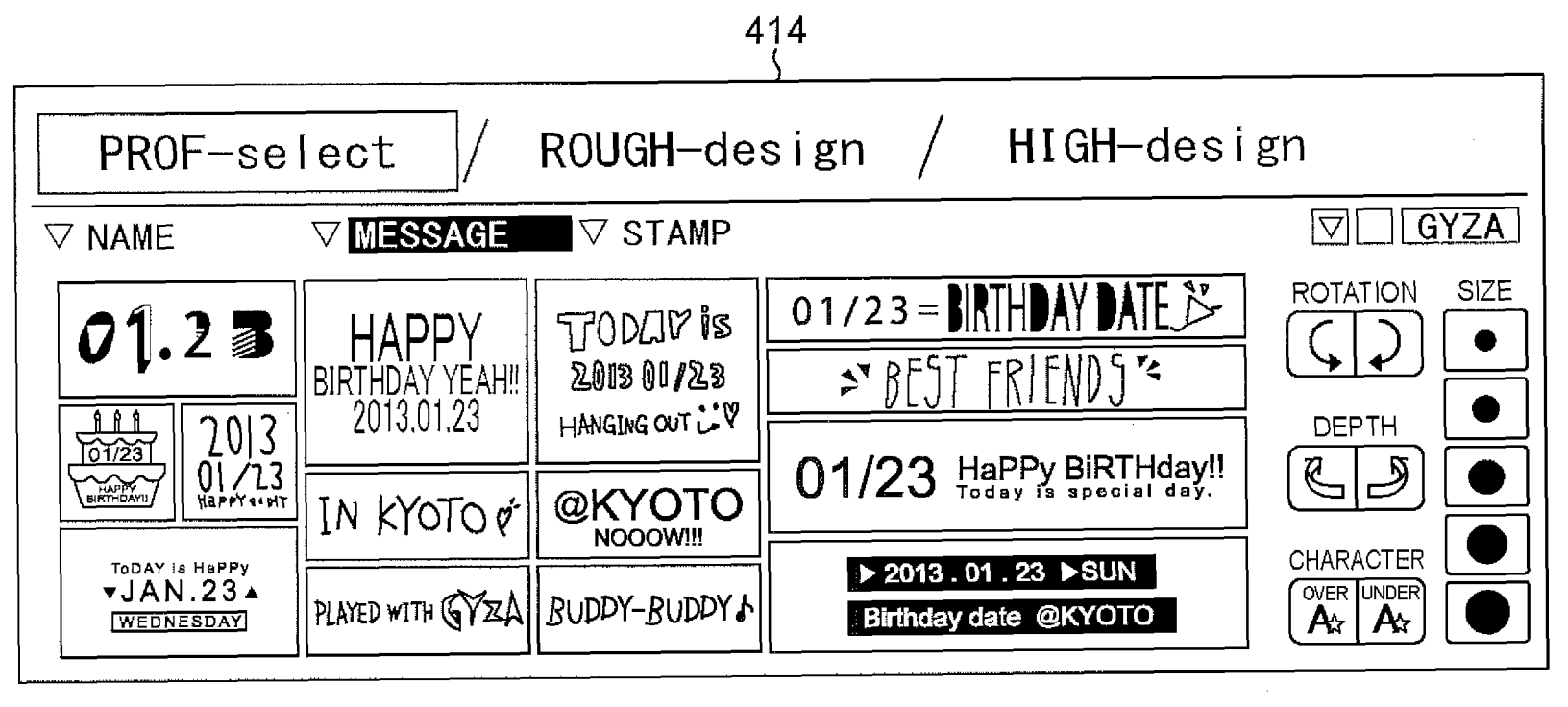

FIG. 24 illustrates still another example of the palette for editing where the category of "PROF-select" has been selected.

In the example of FIG. 24, the "MESSAGE" tab is selected, and the images for compositing, of when the "two friends" or "three or more friends" has been selected as the response to the question inquiring about the relationship between the users, and the "birthday" has been selected as the response to the question inquiring about the purpose of behavior of the users, on the profile input screen, are displayed.

To be specific, in the example of FIG. 24, stamp images including a phrase "BEST FRIENDS" and the like that expresses the users are friends, stamp images including a phrase that expresses the date of use (January 23) is the birthday of any of the users, a stamp image mimicking a birthday cake, and a stamp image including a phrase that expresses that a facility where the photo sticker creating device 1 is installed is "Kyoto" are displayed. Note that the date of use may be set such that the user inputs an arbitrary date to a date input screen displayed at predetermined timing.

Figure 25:
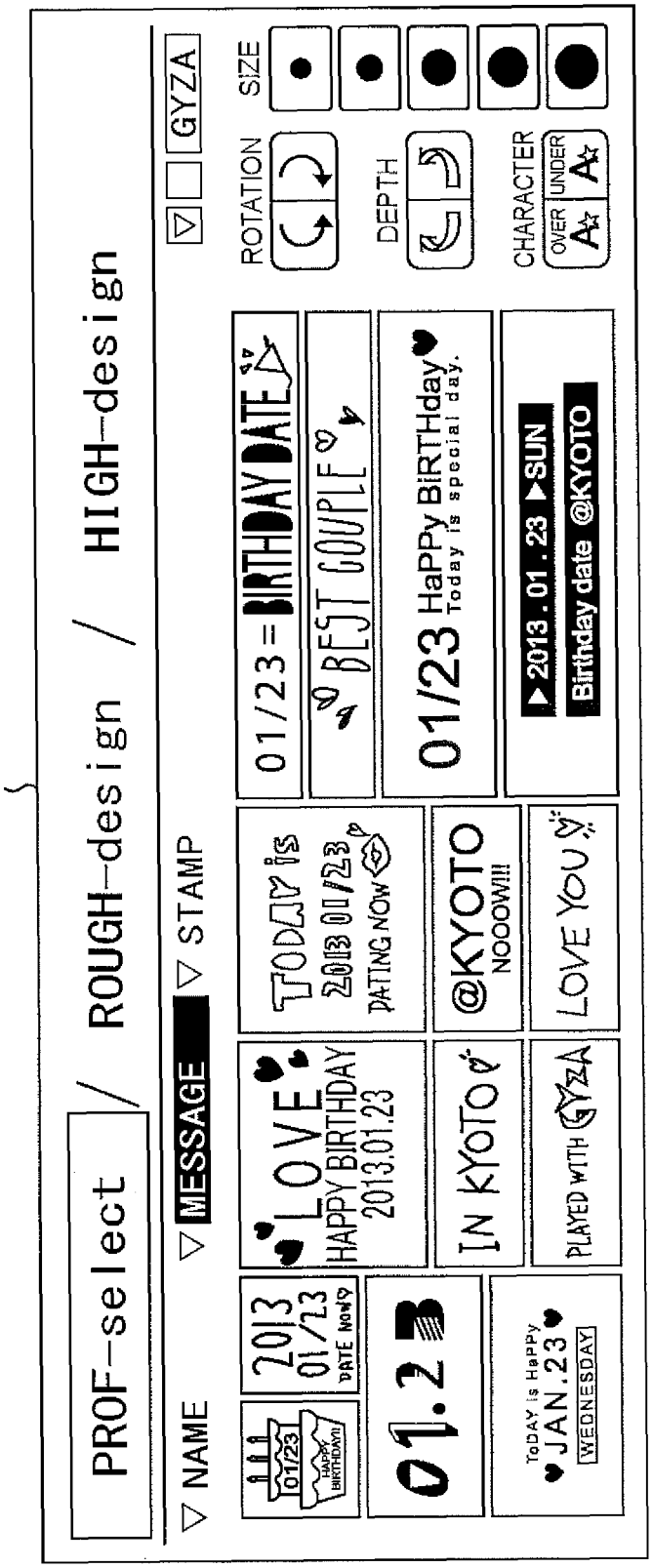
FIG. 25 is a diagram illustrating an example of the palette for editing.

FIG. 25 illustrates still another example of the palette for editing where the category of "PROF-select" has been selected.

In the example of FIG. 25, the "MESSAGE" tab is selected, and images for compositing, of when the "darling and honey" has been selected as the response to the question inquiring about the relationship between the users, and the "birthday" has been selected as the response to the question inquiring about the purpose of behavior of the users, on the profile input screen, are displayed.

To be specific, in the example of FIG. 25, stamp images including a phrase "BEST COUPLE" and the like that expresses that the users are a couple, stamp images including a phrase that expresses the date of use (January 23) is the birthday of one of the users, a stamp image mimicking a birthday cake, and a stamp image including a phrase that expresses a facility where the photo sticker creating device 1 is installed is "Kyoto" are displayed.

As described above, the stamp images displayed in the palette for editing, where the "PROF-select" tab is selected and the "MESSAGE" tab is selected, are changed, according to the response selected by the user to the question inquiring about the relationship between the users, on the profile input screen (FIG. 15), and the response selected by the user to the question inquiring about the purpose of behavior of the users, on the profile input screen (FIG. 16 or 18).

Note that the stamp images displayed in the palettes for editing illustrated in FIGS. 24 and 25 are all made of only stamp images based on the relationship between the users and the purpose of behavior of the users. However, other stamp images may be mixed.

Further, although not illustrated, the stamp images displayed in the palette for editing, where the "PROF-select" tab is selected, and the "STAMP" tab is selected, are also changed, according to the response selected by the user to the question inquiring about the relationship between the users, on the profile input screen (FIG. 15), and the response selected by the user to the question inquiring about the purpose of behavior of the users, on the profile input screen (FIG. 16 or 18).

For example, when the "darling and honey" has been selected as the response to the question inquiring about the relationship between the users, as the stamp images displayed in the palette for editing where the "STAMP" tab is selected, many heart-shaped stamp images are displayed.

Further, when the "Halloween" that is a limited time event has been selected as the response to the question inquiring about the purpose of behavior of the users, as the stamp image displayed in the palette for editing where the "STAMP" tab is selected, a stamp image of a character associated with Halloween. When "Christmas" has been selected, a stamp image of decoration associated with Christmas and a stamp image of Santa Claus are displayed.

Further, when the "memorial day" has been selected as the response to the question inquiring about the purpose of behavior of the users, a stamp image including the date of use is displayed in the palette for editing where the "MESSAGE" tab is selected. Note that the date as the "memorial day" may be changed by the user from the date of use.

Accordingly, the user can perform the editing work using an editing tool suitable for company being together on the day, or a place where the user has visited on the day, whereby a finally obtained image can be made memorable.

Note that, in the palette for editing where the category of "ROUGH-design" or "HIGH-design" has been selected, only fixed stamp images that are not based on the responses selected by the user on the profile input screen with respect to the questions inquiring about the state of the user are displayed. That is, a palette for editing made of only the images for compositing not based on the state of the user is displayed, separately from the palette for editing made of only the images for compositing based on the state of the user.

Figure 14:
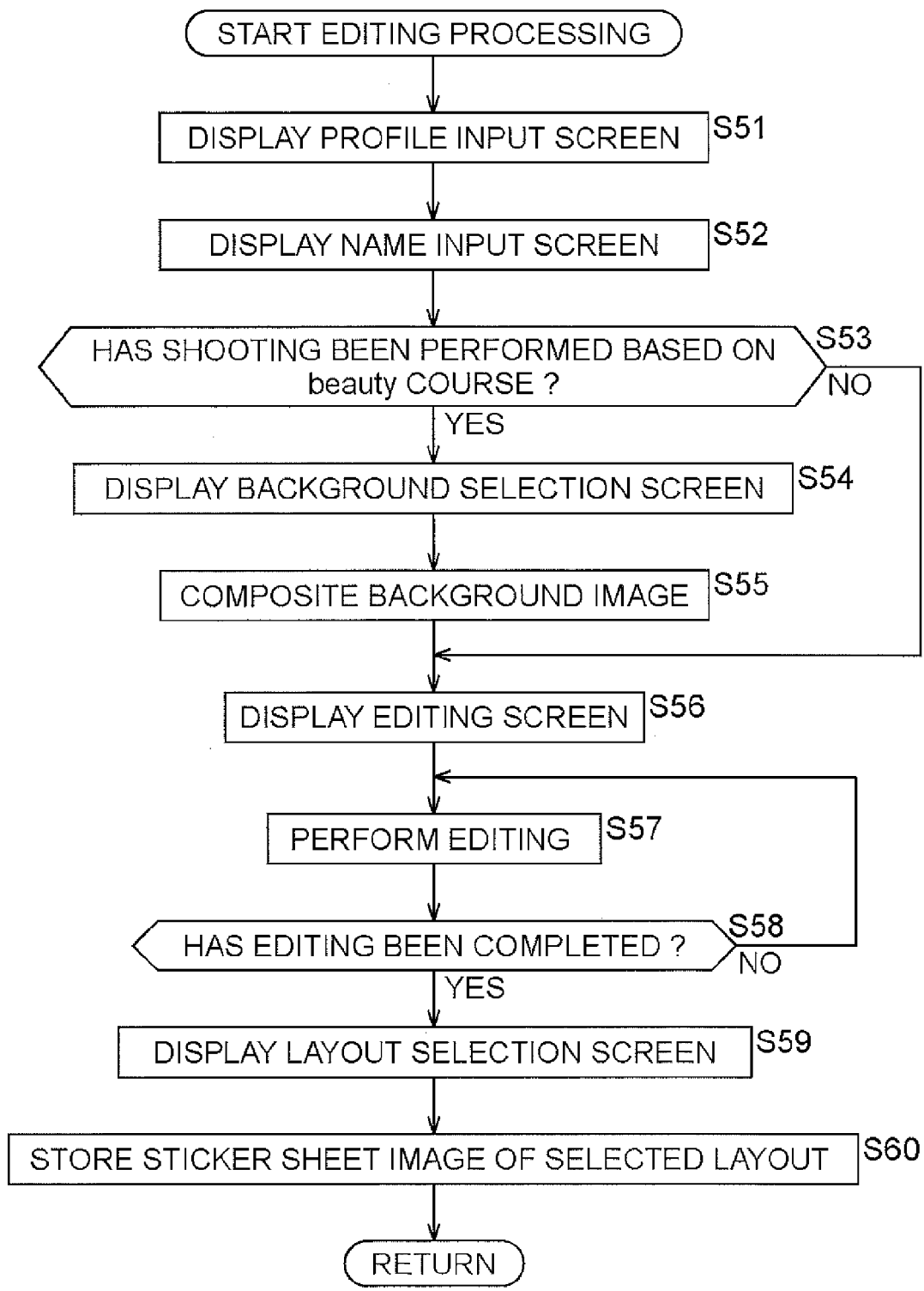
FIG. 14 is a flowchart describing editing processing.

Here, referring back to the flowchart of FIG. 14, in step S57, the compositing processing section 313 performs editing of the shot image, that is, performs compositing (affixing) of the images for compositing selected by the user, according to an editing input by the user.

In step S58, the editing processing section 302 determines whether the editing has been completed, and when having determined that the editing has not been completed, the processing is returned to step S57, and the editing of the shot image is continued. The editing of the shot image is continued until a completion button is operated or until a time limit passes.

Meanwhile, when having determined that the editing has been completed in step S58, in step S59, the display control section 311 displays a layout selection screen in the tablet built-in monitor 131. In the layout selection screen, a sticker layout for determining arrangement of the edited image on the sticker sheet output at the end.

When a predetermined sticker layout has been selected from the layout selection screen, in step S60, the editing processing section 302 stores the sticker sheet image with the sticker layout selected by the user in the storage section 202. Following that, the processing is returned to step S4 of FIG. 13, and subsequent processing is performed.

According to the above processing, when the user is allowed to perform editing work, the images for compositing based on the state of one or more users, to be specific, the relationship between the users and the purpose of behavior of the users, are provided.

Typically, when the users of the photo sticker machine perform the editing work, the users often input the own names, the relationship between the users, and the purpose of behavior of the users on the date of use, using a pen tool by handwriting. However, if inputting the above content by handwriting, it takes time, and at the end, the users may not be able to perform the editing work that the users are satisfied.

Meanwhile, according to the above-described editing processing, the user can select stamp images based on the responses to the questions inquiring about the relationship between the users and about the purpose of behavior of the users, and can composite (affix) the stamp images to the shot image to be edited when performing the editing work. Therefore, the user can perform the editing work, which is often performed by the user, without taking time. As described above, in the photo sticker creation game of the present invention, carefully selected images for compositing can be provided with a small number of questions. Moreover, the editing work desired by the user can be made easy. Further, in this case, the sticker sheet printed at the end becomes a more value-added sticker sheet.

Further, when causing the user to perform input work of inputting a specific number of users, it is necessary to present the numbers of 0 to 9 and to cause the user to select a number. This may take up the user's time. Typically, as the users of the photo sticker machine, a percentage of two friends is the largest, followed by three or more friends, and couples. Therefore, the profile input screen of FIG. 15 is displayed, and the user is allowed to select any of the response buttons 331 to 333, whereby most of the users can perform the input work of the number of users, without taking time.

Note that, in the above, the one touch editing is performed by an operation of the one touch editing button 415L (415R), and the images for compositing determined in advance are collectively composited to the shot image. However, the images for compositing may be images for compositing based on the state of the user, to be specific, the relationship between the users and the purpose of behavior of the users.

Accordingly, the user can perform the editing work, which is often performed by the user, without taking more time, and the editing work desired by the user can be made easier.

Further, in the above, the images for compositing displayed in the palette for editing are changed according to the relationship between the users and the purpose of behavior of the users. However, the content input by handwriting using a pen tool may be changed. For example, when the "darling and honey" has been selected as the response to the question inquiring about the relationship between the users, a closed curve such as a circle or an ellipse input by handwriting using a pen tool may be changed to a heart-like shape.

Further, the tab itself displayed in the palette for editing may be changed according to the relationship between the users and the purpose of behavior of the users. For example, assume that a "drinking party" or a "karaoke" is supposed as specific content of the "date" that is one of the purposes of behavior of the user. At this time, when the "two friends" or the "three or more friends" has been selected as the response to the question inquiring about the relationship between the users, and the "date" has been selected as the response to the question inquiring about the purpose of behavior of the users, the "STAMP" tab may be changed to a "drinking party" tab or a "karaoke" tab, or these tabs may be added and displayed.

In this case, the heart-shaped stamp image displayed in the "STAMP" tab may be changed to a stamp image mimicking a beer glass in the "drinking party" tab, or may be changed to a stamp image mimicking a microphone in the "karaoke" tab.

Further, as the questions inquiring about the state of the user, the question inquiring about the relationship between the users, and the question inquiring about the purpose of behavior of the users are displayed on the profile input screen. However, other questions (when, with whom, where, what, how, and the like) may be displayed. In this case, a plurality of images for compositing based on responses to these questions is displayed in the palette for editing, whereby the user can perform the editing work of content that is more matched with the own state.

Figure 26:
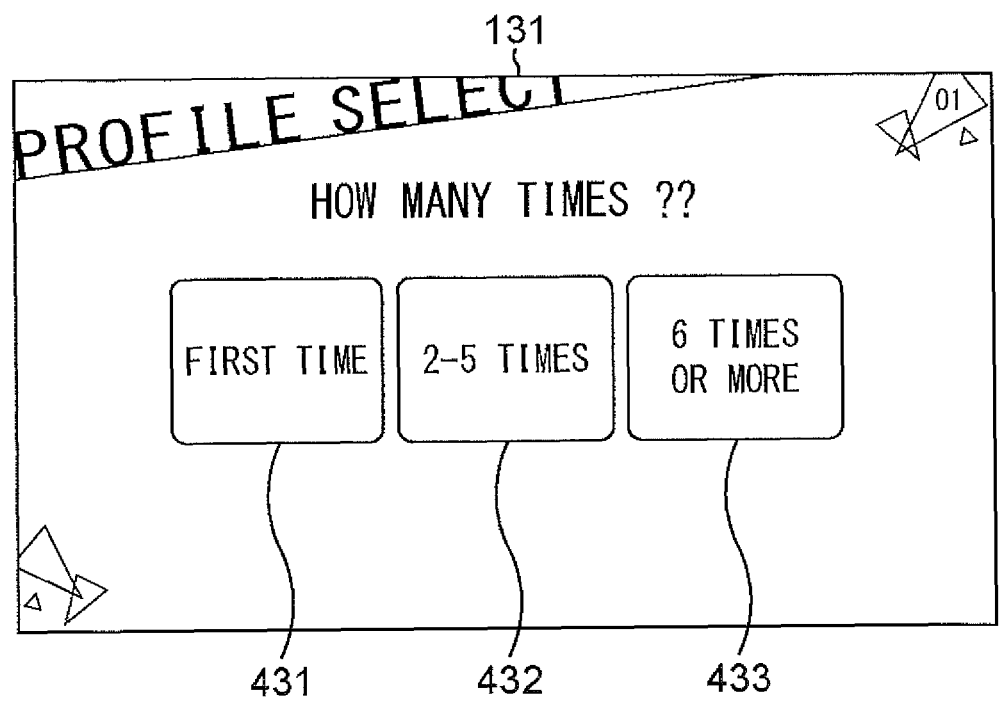
FIG. 26 is a diagram illustrating an example of the profile input screen.

Further, as illustrated in FIG. 26, as the question inquiring about the state of the user, a question inquiring about the number of use of the appropriate type of the photo sticker machines may be displayed on the profile input screen. In this case, as alternatives expressing responses to the question, response buttons 431, 432, and 433 for selecting "first time", "second to fifth times", and "sixth times or more" are displayed on the profile input screen.

Then, when the "first time" has been selected as the response to the question inquiring about the number of use of the appropriate type of the photo sticker machine, the number of images for compositing displayed in the palette for editing is decreased, or the images for compositing are made simple. Further, when the "sixth times or more" has been selected as the response to the question inquiring about the number of use of the appropriate type of the photo sticker machine, the number of images for compositing displayed in the palette for editing is increased, or the images for compositing made complicated. Accordingly, the user can perform the editing work according to the degree of familiarity with the operation in the type of the photo sticker machine, and as a result, the degree of satisfaction of the user can be improved.

Further, background images selectable by the user may be changed according to the state of the one or more users.

For example, when the "two friends" or the "three or more friends" has been selected as the response to the question inquiring about the relationship between the users, both of the users are often females. Therefore, as the background images selectable by the user, background images of a color (for example, pink) that females like are increased, and displayed on the background selection screen. Further, when the "darling and honey" has been selected as the response to the question inquiring about the relationship between the user, a background image including a phrase of "Best Couple!!" and a background image combined with a frame image including a similar phrase are displayed on the background selection screen.

In this case, the background image sets, the background image set being a set of background images based on the state of the one or more users, may be displayed and selected by the user.

Further, conventionally, as an image to be posted to a site that provides a community such as an SNS or a blog, an image for SNS which is a combination of a plurality of shot images captured in the photo sticker machine is transmitted to a server of the site. Information such as a name of a user, an installation place of the photo sticker machine, the type of the machine, and dates is added to the image for SNS.

Therefore, in the present invention, as the information added to the Image for SNS, information based on the state of the one or more users (an image expressing characters) may be added. Accordingly, the editing work of the image to be displayed in the mobile terminal and the like of the user, such as the Image for SNS, can be made easier.

Further, when the operations of the touch pens 132A and 132B by the user have not been made for a fixed time, at the time of an editing input to the editing screen, a pop-up screen including the questions inquiring about the state of the one or more users and the alternatives of the responses to the question may be displayed.

For example, a sentence expressing a question of "do you like cake?" and response buttons for selecting "YES" and "NO" as the alternatives of the responses are displayed on the pop-up screen. Here, when the response button "YES" has been selected, the image for compositing displayed in the palette for editing is changed to an image for compositing mimicking a cake. When response button "NO" has been selected, a sentence expressing a new question is displayed.

Further, a sentence expressing a question of "what is your job (grade)?" and response buttons for selecting "junior high school student", "high school student", "college student", "adult", and the like as alternatives of the responses may be displayed on the pop-up screen. In this case, information indicating the content of the selected response and the image for compositing selected by the user is transmitted to and accumulated in the server. At the time of the editing processing, the photo sticker creating device 1 and the server perform communication, whereby a more frequently used image for compositing among other users of the selected job (grade) may be displayed in the palette for editing.

Accordingly, the user can perform the editing work, which is often performed by other users of the same generation as the user, without taking time. The editing work desired by the user can be made easier and more interesting.

Note that the questions and the responses to the questions displayed on the pop-up screen may be displayed in a profile input screen as illustrated in FIGS. 15 to 19A and 19B.

Note that, while the profile input screen is displayed in the editing processing in the above description, the profile input screen may be displayed in the shooting processing, or may be displayed in the pre-service processing performed before the shooting processing.

Note that, in the above-described embodiment, the photo sticker creating device 1 prints the shot image and the edited image on the sticker sheet, and transmits the images to the server, thereby to provide the images to the mobile terminal of the user. However, the photo sticker creating device 1 may employ a configuration only to transmit the shot image and the edited image to the server, thereby to provide the images to the mobile terminal of the user, without printing the images on the sticker sheet. To the contrary, the photo sticker creating device 1 may employ a configuration only to print the shot image and the edited image on the sticker sheet without transmitting the images to the server.

The above-described series of processing can be executed by hardware or can be executed by software. When the above-described series of processing is executed by software, a program that configures the software is installed from a network or a recording medium.

The recording medium is configured from, as illustrated in FIG. 10, separately from the main body of the device, not only the removable medium 205 formed of a magnetic disk (including a flexible disk), an optical disk (including a CD-ROM and a DVD), a magneto-optical disk, or a semiconductor memory, in which the program is recorded, and which is distributed for delivering the program to an administrator of the photo sticker creating device 1, but also the ROM 206 or a hard disk included in the storage section 202, in which the program is recorded, and which is distributed to the administrator in a state of being incorporated in the main body of the device in advance.

Note that, in the present specification, the steps describing the program recorded in the recording medium include not only the processing performed along the described order in time series, but also the processing executed in parallel or separately executed, even if not necessarily processed in time series.

In the above, the print medium is not limited to a sticker sheet and a photograph sheet. For example, the images may be printed on a sheet or a film having a predetermined size, a sheet for poster, a card such as a telephone card, or cloth such as a T-shirt, or the like.

Further, embodiments of the present invention are not limited to the above-described embodiments, and various changes can be made without departing from the gist of the present invention.

What is claimed is:

1. An image output device comprising:
a shooting processing section configured to shoot one or more users as an object to generate a shot image;
an editing processing section configured to allow the one or more users to edit the shot image;
an output processing section configured to output the shot image that has been edited;
a display control section configured to control display of an image for compositing to be composited to the shot image, the display control section (i) displaying a question asking the one or more users to identify an event in which the one or more users are participating, (ii) receiving a selection of the event from the one or more users, and (iii) displaying the image for compositing in response to the selection of the event provided by the one or more users; and
a compositing processing section configured to composite the displayed image for compositing to the shot image.

2. The image output device according to claim 1, wherein the display control section controls display of a group of images for compositing, the group of images including the image for compositing in response to the selection of the event by the one or more users.

3. The image output device according to claim 2, wherein the compositing processing section composites, to the shot image, the image for compositing selected by the user from the group of images for compositing.

4. The image output device according to claim 1, wherein the display control section controls display of the image for compositing based on a relationship between the users and in response to the selection of the event by the one or more users.

5. The image output device according to claim 1, wherein the display control section controls display of a screen that displays selectable events as candidates of a response by the one or more users to the displayed question.

6. The image output device according to claim 1, wherein the display control section controls display of a group of images for compositing having only the images for compositing based on the selection of the event by the one or more users.

7. The image output device according to claim 1, wherein the display control section controls display of a second group of images for compositing having only images for compositing not based on the selection of the event by the one or more users, separately from a first group of images for compositing having only the images for compositing based on the selection of the event by the one or more users.

8. The image output device according to claim 1, wherein the shooting processing section shoots the one or more users as an object in a shooting space, and
the editing processing section allows the one or more users to edit the shot image in an editing space different from the shooting space.

9. The image output device according to claim 1, wherein the output processing section prints the shot image on a sticker sheet.

10. The image output device according to claim 1, wherein the output processing section outputs the shot image to a mobile terminal through a server.

11. A method of outputting an image from an image output device, the method comprising:
shooting one or more user as an object to generate a shot image;
allowing the one or more users to edit the shot image;
outputting the shot image that has been edited;
displaying a question asking the one or more users to identify an event in which the one or more users are participating;
receiving a selection of the event from the one or more users;
displaying an image for compositing to be composited to the shot image in response to the selection of the event provided by the one or more users; and
compositing the displayed image for compositing to the shot image.

* * * * *